US012612519B2

(12) United States Patent
De Silva et al.

(10) Patent No.: US 12,612,519 B2
(45) Date of Patent: **\*Apr. 28, 2026**

(54) CHEMICALLY SURFACE MODIFIED CARBON BLACK AND METHODS OF MAKING SAME

(71) Applicant: Continental Carbon Co., Houston, TX (US)

(72) Inventors: Lashan Madusha Hendavitharanage De Silva, Dickinson, TX (US); Raymond Soufiani, Katy, TX (US); Eduardo Vega, Jr., Richmond, TX (US); Angel Jose Marcucci, Spring, TX (US); Michael Brendan Rodgers, Leander, TX (US)

(73) Assignee: Continental Carbon Co., Houston, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/541,191

(22) Filed: Dec. 15, 2023

(65) Prior Publication Data

US 2024/0110066 A1     Apr. 4, 2024

Related U.S. Application Data

(62) Division of application No. 18/217,317, filed on Jun. 30, 2023.

(Continued)

(51) Int. Cl.
C09C 1/56          (2006.01)
C08K 9/04          (2006.01)
(Continued)

(52) U.S. Cl.
CPC ............... C09C 1/565 (2013.01); C08K 9/04 (2013.01); C08L 9/06 (2013.01); C09C 3/08 (2013.01);
(Continued)

(58) Field of Classification Search
CPC .............. C01P 2004/61; C01P 2004/62; C01P 2004/64; C01P 2006/12; C01P 2006/22;
(Continued)

(56) References Cited

U.S. PATENT DOCUMENTS

2022/0363864 A1\* 11/2022 Westenberg .......... C08F 212/08

FOREIGN PATENT DOCUMENTS

WO     WO-2021001156 A1 \*  1/2021  ........... B60C 1/0016

OTHER PUBLICATIONS

Vacuum filtration Aug. 8, 2007.\*

\* cited by examiner

*Primary Examiner* — Shuangyi Abu Ali
(74) *Attorney, Agent, or Firm* — Daniel A. Thomson; Emerson Thomson Bennett®, LLC

(57)          ABSTRACT

A method of producing a surface modified low hysteresis carbon black or a refined surface modified low hysteresis carbon black compound includes treating a surface of a low hysteresis carbon black with about 0.1% weight by volume to about 50% weight by volume of surface modifying agent in a solvent, and heat treating the surface of the low hysteresis carbon black following the treatment of the surface with the surface modifying agent to form a surface modified low hysteresis carbon black compound, wherein the surface modifier includes at least one amine group and at least one thiol group and/or di- and/or polysulfidic linkage.

16 Claims, 12 Drawing Sheets

Related U.S. Application Data

(60) Provisional application No. 63/460,242, filed on Apr. 18, 2023, provisional application No. 63/357,991, filed on Jul. 1, 2022.

(51) Int. Cl.
*C08L 9/06* (2006.01)
*C09C 3/08* (2006.01)

(52) U.S. Cl.
CPC .. *C08K 2201/005* (2013.01); *C08K 2201/006* (2013.01); *C08L 2205/02* (2013.01)

(58) Field of Classification Search
CPC ........ C08K 2201/005; C08K 2201/006; C08K 3/06; C08K 3/22; C08K 5/09; C08K 5/18; C08K 5/3725; C08K 5/47; C08K 9/04; C08L 2205/02; C08L 9/00; C08L 9/06; C08L 91/00; C08L 91/06; C09C 1/56; C09C 1/565; C09C 3/08; G10H 1/346

See application file for complete search history.

Figure 5

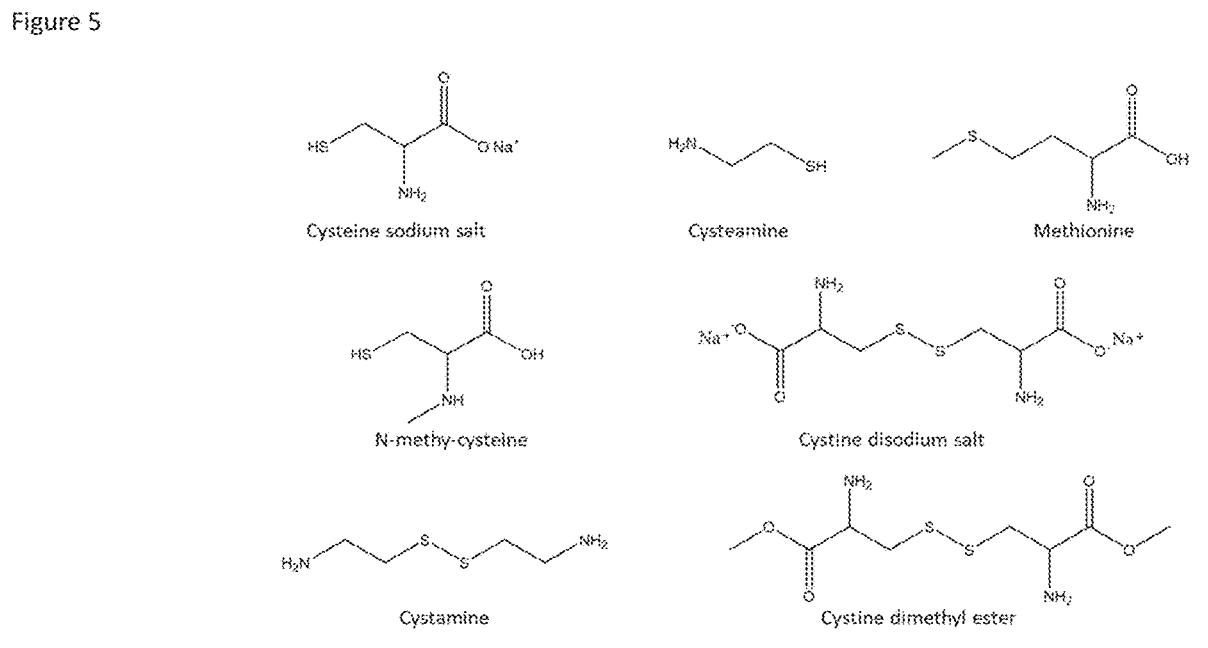

Cysteine sodium salt

Cysteamine

Methionine

N-methy-cysteine

Cystine disodium salt

Cystamine

Cystine dimethyl ester

Figure 11

CHEMICALLY SURFACE MODIFIED CARBON BLACK AND METHODS OF MAKING SAME

CROSS-REFERENCE TO RELATED APPLICATIONS

This application is a divisional of U.S. non-provisional patent application Ser. No. 18/217,317 filed Jun. 30, 2023, entitled "Chemically Surface Modified Carbon Black and Methods of Making Same", which claims priority to U.S. Provisional Application No. 63/357,991 filed Jul. 1, 2022 entitled "Thermochemically Surface Modified Carbon Black to Improve Tire Rolling Resistance, Wet Traction, and Wear Resistance Comparable to the Silica and Methods of Making Same," and to U.S. Provisional Application No. 63/460,242 filed Apr. 18, 2023 and entitled "Carbon Black for Truck Tire Tread Compound," each of which is hereby incorporated herein by reference in its entirety for all purposes.

TECHNICAL FIELD

This disclosure relates generally to rubber carbon black compositions, referred to by those knowledgeable in the art as compounds. In particularly, the disclosure relates to treated carbon black materials and methods of making same.

BACKGROUND

Disclosed herein is an unrefined surface modified low hysteresis carbon black (SMLHCB) or a refined surface modified low hysteresis carbon black (SMLHCB-R) product, comprising: a low hysteresis carbon black having a surface that has been modified to have a surface modifier or fragment of surface modifier attached thereto, wherein the surface modifier comprises at least one amine group and at least one thiol group and/or di- and/or polysulfidic linkage thereof, wherein the surface modifier attached on a fraction of surfaces of low hysteresis carbon black, and the surface modifier exists at discrete, spaced apart regions at the surface of the low hysteresis carbon black.

Also disclosed herein is a method of producing a SMLHCB comprises treating a surface of a low hysteresis carbon black with about 0.1% (w/v) to about 50% (w/v) of surface modifying agent in a suitable solvent (e. g., water) followed by a heat treatment wherein the surface modifier comprises at least one amine group and at least one thiol group and/or di- and/or polysulfidic linkage.

Also disclosed herein is a rubber compound comprising a SMLHCB or SMLHCB-R product wherein a SMLHCB or SMLHCB-R having a surface that has been modified to have a surface modifier or fragment of surface modifier attached thereto, wherein the surface modifier comprises at least one amine group and at least one thiol group and/or di- and/or polysulfidic linkage thereof, wherein the surface modifier in SMLHCB or SMLHCB-R attached on a fraction of surfaces of low hysteresis carbon black, and the surface modifier exists at discrete, spaced apart regions at the surface of the low hysteresis carbon black.

SUMMARY

An embodiment of a method of producing a surface modified low hysteresis carbon black (SMLHCB) or a refined surface modified low hysteresis carbon black (SMLHCB-R) compound comprises treating a surface of a low hysteresis carbon black with about 0.1% (w/v) to about 50% (w/v) of surface modifying agent in a solvent, and heat treating the surface of the low hysteresis carbon black following the treatment of the surface with the surface modifying agent to form a SMLHCB compound, wherein the surface modifier comprises at least one amine group and at least one thiol group and/or di- and/or polysulfidic linkage. In some embodiments, the surface modifying agent is linked to the carbon black surface via thermochemical coupling. In some embodiments, the thermochemical coupling comprises heat treatment. In some embodiments, the heat treatment is applied by any suitable heating source. In some embodiments, the low hysteresis carbon black is treated with the surface modifying agent at a temperature ranging from about 60 degrees Celsius (° C.), to about 450° C. for a time period of 72 Hours or less. In some embodiments, the method comprises refining the SMLHCB compound by contacting the SMLHCB compound with a fluid to form a SMLHCB-R compound. In some embodiments, an aggregate size of the low hysteresis carbon black is in a range of from about 0.005 micrometers ($\mu$m) to about 1.0 micrometers ($\mu$m), from about 0.01 to about 0.8 $\mu$m, or from about 0.02 $\mu$m to about 0.6 $\mu$m. In some embodiments, the SMLHCB compound has a surface area ranging from about 10 meters squared per gram ($m^2$/g) to about 250 $m^2$/g, alternatively from about 20 $m^2$/g to about 200 $m^2$/g, or alternatively from about 30 to about 150 $m^2$/g.

DESCRIPTION OF DRAWINGS

FIG. 5 is a table of surface modifying agents suitable for use in the present disclosure.

FIG. 11 depicts the rheometer vulcanization profile for the compounds of Example 12.

Figure 1:
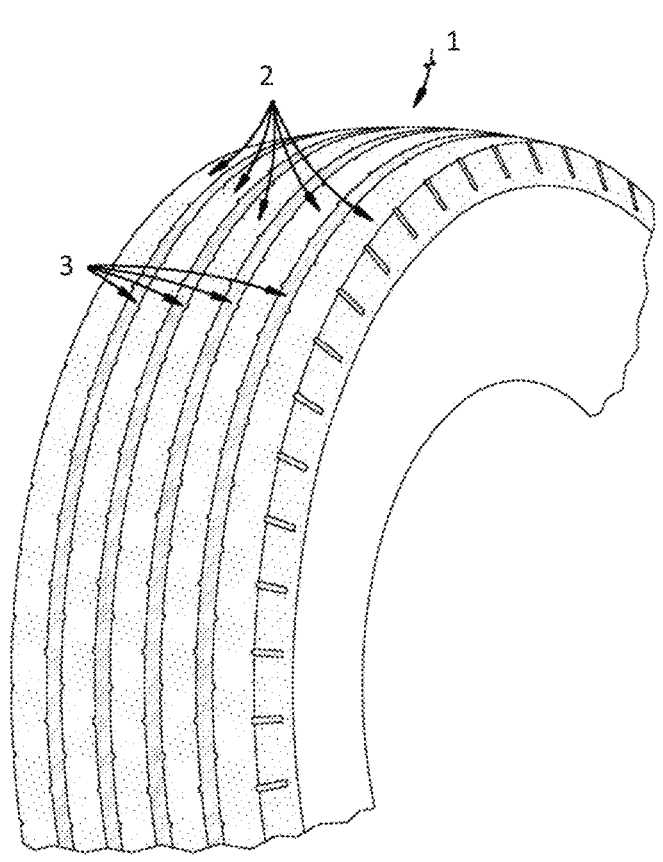
FIG. 1 is a schematic depiction of a cut-away of a truck tire section showing 5 continuous ribs and with four continuous grooves.

Table I provides a list of abbreviations used in this present disclosure.

DETAILED DESCRIPTION

TABLE I

List of Abbreviations Pertinent to the Present Disclosure

| | |
|---|---|
| ASD | Aggregate Size Distribution |
| ASTM | American Society for Testing and Materials |
| BR | Polybutadiene |
| DR | Damage Resistance |
| ESBR | Emulsion SBR |
| LH | Low Hysteresis |
| NR | Natural Rubber |
| PHR | Parts per Hundred Rubber |
| RR | Rolling Resistance |
| SMLHCB | Surface Modified Low Hysteresis Carbon Black |
| SMLHCB -R | Refined Surface Modified Low Hysteresis Carbon Black |
| SSBR | Solution SBR |
| TBR | Truck Bus Radial Tire |
| T-COMPS | Tread Composition |
| TW | Tread Wear |
| WT | Wet Traction |

Tires, as a vehicle's sole link with the roadway, play a key role in automotive safety and also have a direct influence on fuel consumption, as well as many other vehicle—tire system characteristics. Tires are highly engineered rubber products composed of various sections including, for example, the tread region and the carcass or casing. For passenger tire manufacturers, there are three critical properties: rolling resistance (RR), wet traction (WT), and wear resistance (WR) which form the "magic triangle". Tire rolling resistance is related to vehicle fuel efficiency, wet traction is relevant to traction on wet pavement, and wear resistance is associated with tire lifetime. In laboratory tests, rolling resistance and traction properties correlate with the compound hysteresis plot of tangent delta values versus temperatures, and DIN abrasion as described in the test procedure, DIN 53516 and ASTM D5963, can provide estimates of tread wear. Tangent delta at temperatures from 30° C. to 70° C. and preferably from 60° C. to 70° C. is used as a predictor for rolling resistance while tangent delta at 0° C. is used as a prediction for wet traction. Lower tangent delta at 50° C. to 70° C., and in this instance, 70° C., for lower rolling resistance and higher tangent delta at 0° C. for better wet traction are desirable. In the case of ASTM grade carbon blacks, a plot of tangent delta versus temperature shifts up or down by grade and hence either wet traction or rolling resistance can be improved. Since the 1990s, tire manufacturers have been using silica as a reinforcing filler in their tire tread compound to optimize both rolling resistance and wet traction significantly without loss in tread wear resistance.

However, compounding with silica has its own disadvantages: due to abrasive nature of silica, it is more difficult to process, and machinery maintenance cost are increased. Using silica as a filler also introduces mixing problems: due to its polar surface, silica is difficult to mix with a hydrocarbon rubber, and requires using a coupling agent in the compound formulation to bridge between silica filler and polymer. Another disadvantage of silica is accumulation of static charge on tread compound due to silica's non-conductivity, static electricity generated in the tire cannot be dissipated, and hence, silica is often used in mix with carbon black to dissipate such electrostatic discharge. The other drawbacks of silica in tire industry are ethanol emissions and higher manufacturing costs due to lower plant throughput rates, and more recently, silica introduces significant challenges to sustainability initiatives in which carbon black and polymers are recovered from recycled tires. Additionally, although the use of silica can improve rolling resistance and wet traction in certain rubber compounds, these advantages are not present in all rubber compounds, notably natural rubber used in truck tires treads. Since the late 80s, scientists have researched methods to overcome these issues utilizing various approaches, development of new specialty carbon blacks and or modifying ASTM grade carbon blacks to develop compounds with similar properties to silica compounds. These strategies are mainly focused on increasing filler-polymer interactions and reducing filler-filler interactions by modifying compound ingredients (e.g., carbon black, polymer) and mixing procedures.

To reduce filler-filler interaction, carbon black manufacturers introduced low hysteresis carbon blacks (LH) which have wider aggregate size distribution (ASD) with higher percentage of larger aggregates compared with standard ASTM carbon blacks. Low hysteresis carbon blacks reduce filler-filler network strength by increasing the average inter-aggregate spacing while maintaining the same average strength of polymer-filler interactions which in turn improves the rolling resistance. (e.g., see U.S. Pat. No. 7,238,741). Notably, low hysteresis carbon blacks are not adequate for increasing polymer-filler interactions to improve compound properties other than rolling resistance.

To increase filler-polymer interaction, researchers attempted chemical modification of carbon black. Enormous studies of surface treatment of carbon blacks have been conducted in this approach (e.g., see U.S. Pat. No. 9,005,359 B2). Although improvement in rolling resistance or other properties was achieved, they were not successful in simultaneous improvement of all three properties: rolling resistance, wet traction, and wear resistance. Although filler-polymer interactions were improved, filler-filler networking was still predominant.

In this present disclosure, the above two main strategies have been combined together by chemical modification of low hysteresis carbon black in which filler-filler network strength is advantageously decreased while filler-polymer interactions are increased resulting in simultaneous improvement of rolling resistance, wet traction, and wear resistance.

Truck Tires

Fuel expenses are one of the major costs encountered by the trucking industry. In recent years, many modifications have been implemented which makes commercial trucks and tractor-trailer combinations more energy efficient. For instance, better fuel efficiency is being attained by implementing more aerodynamic designs to both the tractor and trailer and which combined, offer a lower coefficient of drag. The energy loss breakdown for a truck or tractor-trailer combination travelling at 88 kph (55 mph) is: 42% of the horsepower requirements are required to overcome aerodynamic drag, 15% for drive train losses, 9% for accessories, and 34% for tire rolling resistance. With the ratio of losses changing with vehicle speed and load, tires remain a major contributor to energy consumption of a highway truck. Further reference to the art of testing for truck fuel economy may be obtained in the text, Tire Engineering by B. Rodgers and published by CRC Press. Reductions in tire rolling resistance can have direct effects on truck fuel consumption. In the case of line haul trucks, 2.5% to 3.5% reduction in tire rolling resistance can generate 1% fuel savings. In automobile tires the improvement is not as large with ratios closer to 7:1. Hence truck tire rolling resistance reduction has greater benefits for commercial vehicle operators, both in terms of cost and positive environmental impact. However, one challenge to achieve these objectives is that good rolling resistance which favors low energy loss and good traction characteristics which favor high energy loss are inconsistent properties.

Improved fuel efficiency can be attained by designing tires which display lower rolling resistance. To reduce the rolling resistance of a tire, rubber compounds having a high resilience, as measured by the simple rebound test, can be utilized in making the tire tread. Tires made with such rubbers undergo less energy loss during rolling. However, the traditional problem associated with this approach is that the tread compound of a tire suitable for use on a heavy-duty commercial truck tire must also show high tensile strength and excellent tear strength, thus limiting the selection of polymer to only natural rubber. The available variables which can be used to improve a natural rubber-based truck tire tread compound are thus limited to the filler system such as carbon black and silica.

Passenger tire tread compounds containing high levels of highly dispersible silica, abbreviated as HDS, containing a silane coupling agent and solution SBR, as described in U.S. Pat. No. 5,227,425, have proven to be very effective at improving tire-vehicle fuel economy and wet traction. However, for commercial truck tires, the loss in tread wear performance by use of silica has negated any improvement in lowering whole tire rolling resistance. In this present disclosure a new technology carbon black has been developed to achieve the necessary compound hysteresis benefits required for low truck tire rolling resistance and fuel economy but without the loss in abrasion resistance found in instances with high silica content in tread compound formulations.

Further to the present disclosure, low hysteresis compounding additives typically result in a drop in compound tear resistance, affecting a tire's durability which is a critical performance parameter for commercial truck tires operating in line haul service, short haul and stop-start conditions and on-off road service.

Though natural rubber is the preferred rubber for truck tire tread compounds, retreaded truck tuck tires for general purpose applications would most frequently use oil extended emulsion SBR (ESBR) in the tread compound. Such treads are prepared by one of two methods, i) mold cure where the tire casing is prepared, a new tread compound is extruded onto the prepared casing and the tire is then vulcanized in a mold for a defined time and temperature. The more common method, termed pre-cure, is via extrusion of a tread and then partial curing in a mold to form the tread pattern. This product is later applied to a prepared tire casing and then the new retreaded tire is placed in an autoclave to complete the vulcanization process. Emulsion SBR is preferred for such applications because of compound mixing efficiency, good compound reversion resistance, and good abrasion resistance. However, of equal importance to new tires is retreaded tire rolling resistance. Use of SMLHCB in an emulsion SBR retread compound facilities attainment in rolling resistance performance and hence vehicle fuel economy which is required by truck operators, and not attainable by other means without loss in manufacturing efficiency or in other tire properties. SMLHCB in ESBR and oil extended ESBR will mix with the efficiencies as conventional carbon black grades while lowering compound hysteresis and this improves truck fuel efficiency with no loss in wear performance or traction.

Treatment of carbon black with chemicals such as amino acidic compounds or its' derivatives as described in this present disclosure will increase the chemical reactivity of the carbon black surface, thus allowing greater polymer-filler reinforcement, and consequently lower compound hysteresis as represented by the decrease in the Payne effect. It is further expected that the level of treatment will increase as carbon black particle surface area increases. Thus, the principles demonstrated in this instance using the ASTM carbon black grade N234, are equally applicable to all furnace grades of carbon black. Further reference can be made to ASTM D1765 which describes the properties of such carbon blacks including the major groups and then each specific grade. To further identify grades to which this present disclosure is applicable, but not limited to, are tread grade carbon blacks such as N110, N121, and N134, N220, N234, and then casing grade carbon black grades which examples include N330 typically used in tire sidewalls, N326, N339, N347, and N351 which might be used in tire or industrial rubber products fabric or wire coat or skim compounds, N660 typically used in inner liners, and N550 which may be used in parts such as shoulder wedges and the bead filler. This list is an example and not limited to the identified grades as all furnace grades can undergo surface treatment with amino acidic compounds such as cystine and its derivatives such as a disodium salt.

Disclosed herein is a disclosure of surface treated low-hysteresis carbon black materials. In one or more aspects, the carbon black is characterized as a low-hysteresis carbon black. Herein the term "low hysteresis" refers to the carbon black which in a rubber tire compound displays a low amount of energy dissipation during tire normal operation. In one or more aspects, the low-hysteresis carbon black materials of the present disclosure are functionalized through the introduction of chemical moieties to the surface of the materials. In one or more other aspects, the surface density of the chemical moieties introduced to the low-hysteresis carbon black is increased by functionalization of the surface using the methodologies disclosed herein. The low-hysteresis carbon black of the present disclosure may be utilized in any suitable application. Furthermore, the fundamental principles are applicable to all types of carbon blacks such as furnace types, thermal types, and acetylene types which those knowledgeable in rubber compounding are familiar. Furthermore, the fundamental principles are applicable to all types of carbon blacks such as illustrated in Table II.

Furthermore, the fundamental principles described in this present disclosure are applicable to all specific grades of furnace type carbon blacks used in tire and industrial rubber products compounding and defined by ASTM D1765 and described in Table III, and to which those knowledgeable in rubber compounding are familiar. Furthermore, the fundamental principles are applicable to all types of non-ASTM carbon blacks.

TABLE II

| Tire and Industrial Products Carbon Black Categories | | | |
|---|---|---|---|
| Group | ASTM | Particle Size | Application |
| SAF | N110 | 11-19 | Tread |
| ISAF | N220 | 20-25 | Tread |
| HAF | N330 | 26-30 | Tread, Casing |
| FF | N475 | 31-39 | Industrial Products |
| FEF | N550 | 40-49 | Tire Casings, Industrial Products |
| GPF | N660 | 50-60 | Tire Casings, Industrial Products |

TABLE II-continued

| Tire and Industrial Products Carbon Black Categories | | | |
|---|---|---|---|
| Group | ASTM | Particle Size | Application |
| SRF | N762 | 61-100 | Industrial Products |
| MT | N990 | 100-150 | Industrial Products |

The present disclosure further contemplates a rubber composition comprising a natural polymer, a synthetic polymer or a blend thereof and a functionalized low-hysteresis carbon black of the type disclosed herein. Surface functionalized, treated, or modified low-hysteresis carbon black materials prepared as disclosed herein are termed SMLHCB.

TABLE III

| | | | Common Commercial Grades of Carbon Black | | | |
|---|---|---|---|---|---|---|
| ASTM Designation | Iodine Number | Oil Absorption Number | Compressed Oil Absorption Number | NSA Multipoint | STSA | Tint Strength |
| N110 | 145 | 133 | 98 | 126 | 115 | 124 |
| N115 | 160 | 113 | 96 | 137 | 124 | 123 |
| N120 | 120 | 114 | 99 | 122 | 114 | 129 |
| N121 | 121 | 132 | 112 | 121 | 114 | 119 |
| N125 | 117 | 104 | 89 | 122 | 121 | 125 |
| N134 | 142 | 127 | 103 | 143 | 137 | 131 |
| N220 | 121 | 114 | 100 | 119 | 106 | 115 |
| N231 | 121 | 92 | 86 | 108 | 107 | 117 |
| N234 | 120 | 125 | 100 | 119 | 112 | 124 |
| N299 | 108 | 126 | 105 | 104 | 97 | 113 |
| N326 | 82 | 72 | 69 | 78 | 76 | 112 |
| N330 | 82 | 102 | 88 | 82 | 75 | 103 |
| N339 | 90 | 120 | 101 | 93 | 88 | 110 |
| N347 | 90 | 124 | 100 | 85 | 83 | 103 |
| N351 | 68 | 120 | 97 | 73 | 70 | 100 |
| N358 | 84 | 150 | 108 | 80 | 87 | 98 |
| N375 | 90 | 114 | 97 | 96 | 78 | 115 |
| N550 | 43 | 121 | 88 | 42 | 39 | |
| N630 | 36 | 78 | 62 | 32 | 32 | |
| N650 | 36 | 122 | 84 | 36 | 35 | |
| N660 | 36 | 90 | 75 | 35 | 34 | |
| N762 | 27 | 65 | 57 | 29 | 28 | |
| N772 | 30 | 65 | 58 | 32 | 30 | |
| N990 | | 38 | 37 | 9 | 8 | |
| N991 | | 35 | 37 | 8 | 8 | |

SMLHCB for Passenger Tires

Disclosed herein is a thermochemically functionalized low hysteresis carbon black, a SMLHCB and methods of making same. In one or more aspects, a SMLHCB is a component of a rubber composition used in the production of products such as tires, more specifically a filler in a rubber composition. The tire's tread comprising a SMLHCB may be characterized by (i) an improved rolling resistance, (ii) an improved wet traction (iii) an improved wear resistance, (iv) the combinations of (i), (ii), and (iii), or any combination of (i), (ii), or (iii). The tire's tread comprising a SMLHCB may exhibit properties (e.g., mechanical properties) comparable with properties obtained with an otherwise similar composition having silica as the filler.

Without wishing to be limited by theory, filler-filler networking strength is advantageously decreased while polymer-filler interactions are increased using a SMLHCB of the type disclosed herein. These effects improve the rubber tread compound properties of interest simultaneously and thus address the above noted shortfalls of conventional methods. In one or more aspects, a method of the present disclosure comprises treatment of a low hysteresis carbon black with a surface modifying agent under conditions suitable for thermally coupling at least a portion of the low hysteresis carbon black surface with functionalities derived from the surface modifying agent.

SMLHCB for Truck Tires

Disclosed herein are embodiments of a compound of surface modified low hysteresis carbon black (SMLHCB) in a natural rubber truck tire tread compound, which improves rolling resistance while maintaining tear strength and abrasion resistance and thus, address the shortfalls of conventional compounds and methods.

Also disclosed herein is a tread rubber compound formulation suitable for application in Truck Bus Radial (TBR) tires. Herein TBR refer to tires for use in vehicles transporting goods or passengers such as buses, tractors, line haul trucks, travel trailers and multi-stop trucks for example. It is also contemplated that the TBR s of this disclosure may find utility in other contexts where improvements in rolling resistance of vehicle tires is desired nonlimiting examples of which include off-road vehicles (e.g., all-terrain vehicles).

Figure 2:
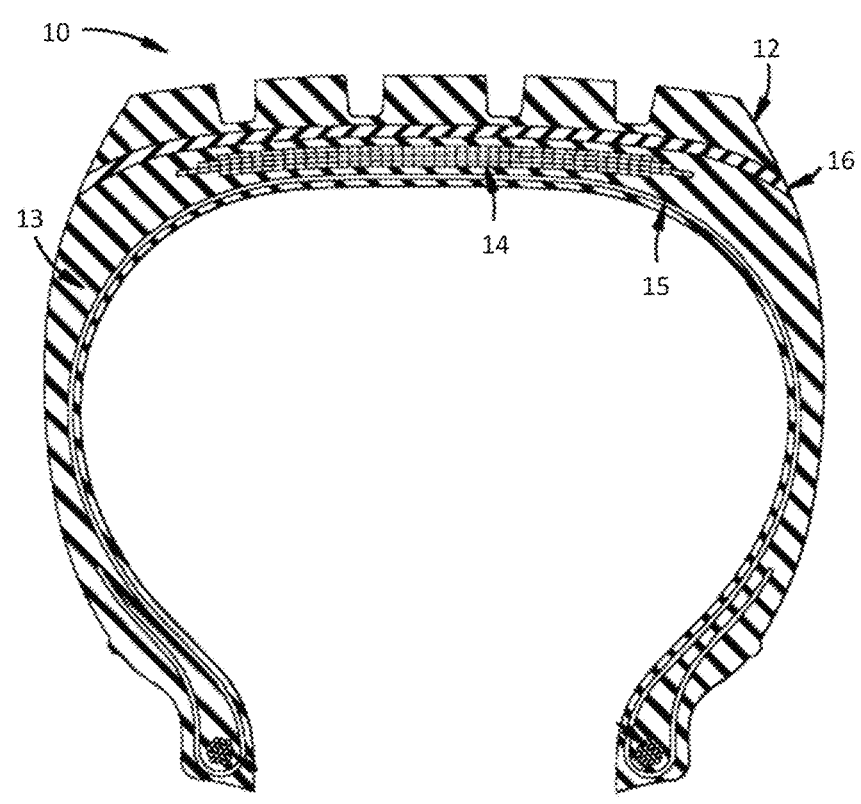
FIG. 2 depicts the tread area of the tire which is the subject of the present disclosure.

Referring to FIGS. 1 and 2, in order to better understand the subject of the present disclosure FIG. 1 presents a schematic depiction of a cut-away of a truck tire tread 1 showing five continuous ribs 2 and with four continuous grooves 3 and 4-rib configurations. Additionally, the tread area 12 of an embodiment of a tire 10 which is the subject of the present disclosure is presented in FIG. 2. Particularly, FIG. 2 illustrates the tire 10 as including a sidewall 13, belts 14, a ply 15, and an under-tread or base 16.

Figure 3:
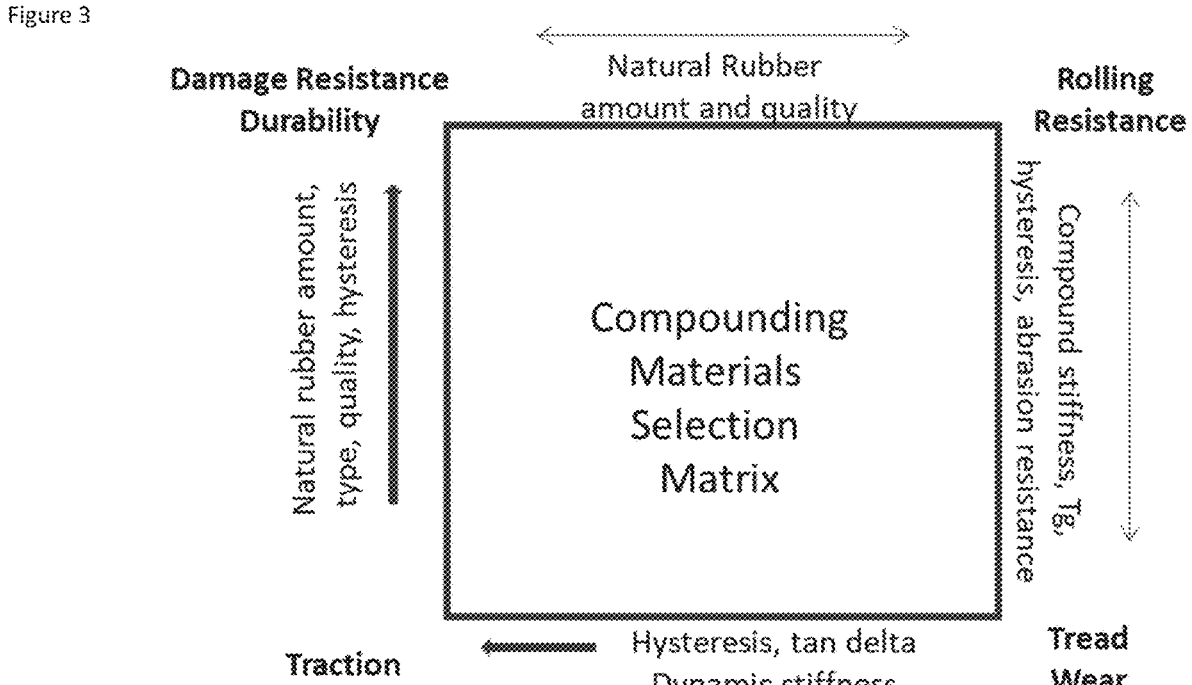
FIG. 3 is a depiction of a truck tire performance diagram indicating the relationship between indexed rolling resistance (RR), wet traction (WT), damage resistance (DR), and tread wear or abrasion (TW).

Referring to FIG. 3, the major components of performance of a commercial truck tire tread compound can be defined by its impact on tire rolling resistance, wet traction, abrasion resistance and damage resistance (FIG. 3). In one or more aspects, a composition suitable for use in preparation of an TBR tread comprises (i) a natural rubber; (ii) a surface modified low hysteresis carbon black; and (iii) an antidegradant. In one or more aspects, an TBR tread composition may be further characterized by a low content of sulfur curative and exclusion of silica and silane coupling agent. A method of the present disclosure may be further characterized by the use of rubber that has been subjected to minimal processing.

Figures 4A, 4B, 4C, 4D:
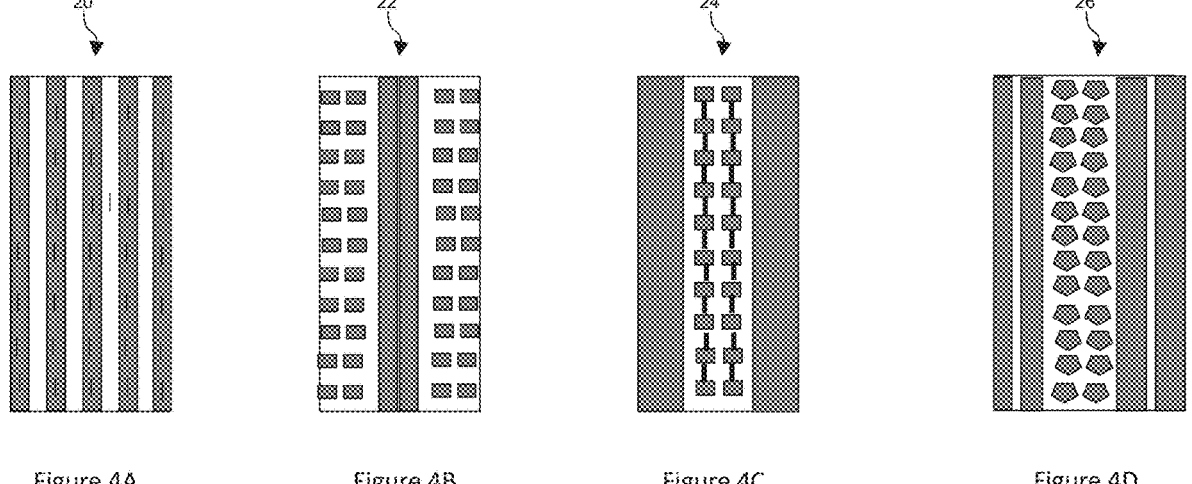
FIGS. 4A-4D are schematic depictions of rib-tread patterns for the indicted tires.

Referring to FIGS. 4A-4D, schematic depictions of rib-tread patterns 20, 22, 24, and 26 are shown, respectively. Particularly, rib-tread pattern 20 of FIG. 4A is a rib tire tread design including five straight ribs, four grooves, and slips in ribs for traction. Rib-tread pattern 22 of FIG. 4B is a rib-lug design comprising outboard lugs for traction and inboard ribs for improved tread wear. Rib-tread pattern 24 of FIG. 4C is another rib-lug design including outboard ribs for improved fuel economy, inboard lugs for improved traction, and tie bars connecting lugs circumferentially to improve lug stability. Finally, rib-tread pattern 26 of FIG. 4D is a trailer tire rib tread design including multiple straight ribs, shallow grooves, high net to gross footprint for improved lateral stability, and a central groove for water dispersion.

Commercial truck tires are designed for the wheel position, i.e., the steer axle tire, drive axle tire, and trailer axle tire. In addition, designs may vary depending on the tire mission profile, e.g., short haul pick-up and delivery, bus and coach, and off road. Steer axle, all-position, and trailer axle tires tend to have rib-tread patterns (e.g., rib-tread patterns 20 and 26). Such designs readily facilitate natural rubber tread compounds. The trend in highway drive axle truck tire tread design is to have solid shoulders (e.g., rib-tread pattern 24) rather than outboard lugs (e.g., rib-tread pattern 22). Even though outboard lugs display greater traction characteristics, such tread designs require compounds consisting of both natural rubber and synthetic rubber such as polybuta-diene and solution SBR and in consequence, high levels of carbon black to achieve the required tensile strength and more important, fatigue resistance. Such compounds tend to display higher hysteresis (higher tangent δ) resulting in higher rolling resistance and increase in vehicle fuel con-sumption. In the case of tread patterns with closed shoulders (i.e., rib-tread pattern 24), all natural rubber compounds can be used with much lower hysteresis, and consequently better (lower) tire rolling resistance. Traction is then altered by adjusting the dimensions of the central rows of lugs and the net footprint contact area. In consequence the same all natural rubber tread compound formulation may be used in all three tire designs, i.e., steer, drive, and trailer tire tread compounds.

Accordingly, the present disclosure also contemplates a sulfur vulcanized tread compound based on natural rubber and modified carbon black described herein. Further, the present disclosure contemplates multiple commercial truck tire types, mounted on vehicles described by the Society of Automobile Engineers (SAE) and Federal Highway Admin-istration as Class 5 (gross vehicle weight rating of 16,001 lbs or 7,258 kg) through to Class 8 (gross vehicle weight rating of 80,000 lbs or 36,287 kg), which can include tires for commercial truck steer axles, drive axles, trailer axles, line haul operations, short haul, pickup and delivery, bus and coach. The range of such tires for such vehicles would also be suitable for light transportation vehicles such as described by the Society of Automobile Engineers as Vehicles in Classes 1 through 4 with gross vehicle weights up to 16,000 lbs. and such tires having a fabric ply construction.

In the present disclosure, to assist in favorably achieving and improving such properties, a carbon black described as a surface modified low hysteresis carbon black is combined with other compounding materials as described herein. Aspects of combinations of elastomers, carbon black, anti-oxidants, process aids, and vulcanization system of the cured truck tire tread is considered herein to be important to achieve the tire treads performance (e.g., maintenance of traction, rolling resistance, and resistance to abrasion). In addition to the above performance properties of the cured tire's ground-contacting tread rubber composition, signifi-cant aspects of the present disclosure are: (i) use of natural rubber, (ii) relatively low level (content) of sulfur curative designed to promote optimum crosslinking and higher chain extension of the tread rubber composition, and which is described as a semi-efficient vulcanization system (semi-EV), (iii) exclusion of a silica and a silane coupling agent for the silica with consequential benefits in manufacturing effi-ciency, (iv) elimination of ethanol emissions with environ-mental benefits, (v) improved tire uniformity, (vi) potential cost reductions when compared to such composition using a conventional silica, highly dispersible silica and a silane coupling agent, (vii) modified low hysteresis carbon black which is a tire tread grade of carbon black, (viii) disclosed ranges for antioxidant content, usually a combination of antioxidant and antiozonant, in order to achieve suitable long-term durability and resistance to fatigue, and (ix) relatively low level of rubber processing oil in order to promote a relatively high tensile strength and optimized processing for the tire tread rubber composition. Accord-ingly, the present disclosure also contemplates a sulfur vulcanized tread compound.

SMLHCB Composition

Referring to FIG. 5, in aspects, the surface modifying agent comprises an amino acidic compound or its' derivative wherein any stereogenic centers present in the compound could be R and/or S configuration. For example, in aspects, the amino acidic compound comprises a naturally occurring amino acid; a modified natural amino acid; a synthetic amino acid; a dimer thereof; a polymer thereof; a salt thereof; a derivative thereof, or a combination thereof. Nonlimiting examples of surface modifying agents suitable for use in the present disclosure include cysteine, cystine, homocysteine, homocystine, methionine, cysteamine, cys-tamine, cystine dimethyl ester, and a combination thereof. Some of the examples of surface modifying agents suitable for use in the present disclosure are illustrated in FIG. 5.

In aspects, the surface modifying agent comprises an amino acidic compound or its' derivative having at least one amine group and one thiol group and/or di- and/or polysul-fidic linkage, and/or an organic or inorganic compound containing at least one amine group, and at least one thiol group and/or di- and/or polysulfidic linkage. In aspects, the amine group described here is not limited to a primary amine group which may be any type of amine (e.g., secondary amine or tertiary amine with the presence of appropriate catalyst) suitable for linking to the carbon black surface. The surface modifying agent may comprise more than one amine or other functional groups. The surface modifying agent may be chemically linked to the surface of the carbon black (e.g., the surface of the low hysteresis carbon black) via single or multiple bonds. In aspects, the surface modifying agent functions to form at least one bond to the surface of the low hysteresis carbon black (e.g., an amide bond).

In an aspect of the methods of the present disclosure, the low hysteresis carbon black, with or without pretreatment, is treated with the surface modifying agent using any suitable methodology. In an aspect, SMLHCB is prepared by treating the surface of the low hysteresis carbon black with about 0.1% (w/v) to about 50% (w/v), with about 0.1 (w/v) to 30% (w/v), preferably with about 1% (w/v) to about 20% (w/v) of surface modifying agent in a suitable solvent (e. g., water) followed by a heat treatment. In an aspect, the mixing of carbon black with surface modifying agent containing solu-tion can be carried out by a technique of pouring, spraying, injecting, dispersing or diffusing. The heat treatment of surface modifying agent mixed carbon black may be achieved at temperatures ranging from about 600 C, to about 450 0 C, alternatively from about 900 C to about 3500 C or alternatively from about 1200 C to about 300 0 C for a time period of from about 0 to about 72 Hours, alternatively from about 0 to about 24 Hours, alternatively from about 0 to about 8 Hours, or preferably from about 0 to about 0.5 Hours. In an aspect, the heat treatment step for thermo-chemical coupling may be carried out using a suitable heating source. Upon reaction, the resulting material is a SMLHCB. The SMLHCB may then be preferably dried to remove any excess reaction solution and used without any further refining.

In an alternative aspect, the SMLHCB is refined using a suitable solvent (e.g., water) to remove weakly bound sur-face modifying agent. Refining of the SMLHCB as a slurry may be carried out in any suitable vessel without but preferably with agitation. In some aspects, subsequent to refining of the SMLHCB with the solvent, the solid carbon material and fluid may be separated and the solid carbon material used with or without further refining.

In some aspects, refining of the SMLHCB is carried out a plurality of times in cycles involving contacting of the SMLHCB with a first amount of a solvent, removal of the fluid and refining the SMLHCB with a second amount of solvent. This may be carried out for any number of cycles so as to meet objectives, desired properties, and final product performance. In another aspect, there may be just 1 refining cycle, or alternatively the number of refining cycles may range from about 1 to about 10, alternatively from about 1 to about 6 or alternatively from about 1 to about 4. The resulting material is termed a refined SMLHCB and designated SMLHCB-R.

In aspects, the resultant SMLHCB or SMLHCB-R comprises functionalities derived from the surface modifying agent bonded to the surface of the low hysteresis carbon black. In aspects wherein the SMLHCB is unrefined, the material additionally contains advantageous associated surface modifying agents or fragments thereof that are electrostatically (ionically) bonded, covalently bonded, Van der Waals forces bonded, hydrogen bonded, other non-covalently bonded with active surface moieties of the surface or alternatively not bonded to the surface of the low hysteresis carbon black and thus at least a portion of which are readily removable by refining the material. Non-limiting examples of types of bonding that may occur between the functionalities present in the surface modifying agent and the low hysteresis carbon black thus include Van der Waals interactions, covalent (including dative bonds) and/or ionic or other non-covalent interactions with active surface moieties of the surface. In one or more aspects, the active surface moieties of the surface of SMLHCB and/or SMLHCB-R comprise oxygen, nitrogen, and/or sulfur and other elements found in materials used in carbon black manufacturing and rubber compounding. As a further example, surface modifying agents containing amine groups may bind to the carbon black surface by reacting with strong acidic groups present on the surface (See for example: Chemical Bonding of tetraethylene pentaamine to Nitric Acid-Oxidized Carbon Fibers: An XPS/ISS Investigation, Steven D. Gardner, Chakravarthy S. K. Singamsetty, Guoren He, and Charles U. Pittman, 51(5), 636, 1997).

In one or more aspects, a low hysteresis carbon black suitable for use in preparation of the SMLHCB can be pretreated by oxidation prior to treatment with a surface modifying agent. Such an oxidative process can be performed to increase the number of acidic groups on the surface of carbon black available to react with, for example, an amine group of the surface modifying agent. In aspects, the pretreatment by oxidation of the carbon black may be performed by methods such as, but not limited to, ozone treatment, heat treatment, plasma treatment, nitrogen oxides treatment, gaseous or aqueous hydrogen peroxide treatment, liquid nitric acid treatment, or a combination thereof.

Another pretreatment may comprise increasing the number of acidic groups on the surface of the low hysteresis carbon black before or during the treatment with a surface modifying agent. Accordingly, in aspects, the method can further comprise using the low hysteresis carbon black directly without acid treatment or activating the surface and/or treating the surface with an acid to facilitate the treating of the surface with the surface modifying agent.

Further pretreatment may comprise converting the carboxylic acid groups on the low hysteresis carbon black to acyl chloride or acid anhydrides prior to treatment with a surface modifying agent. Compared to carboxylic acid, acyl chloride and acid anhydrides readily reacts with amines.

In an aspect, the surface modifying agent comprises from about 0.1 wt. % to about 50 wt. %, from about 0.1 wt. % to about 30 wt. %, from about 1 wt. % to about 16 wt. %, or from about 3 wt. % to about 20 wt. % of the SMLHCB.

In one or more aspects, a SMLHCB of the present disclosure is characterized by a carbon black material having a widened aggregate size distribution with a higher percentage of larger aggregates than a standard ASTM grade carbon black that does not demonstrate low hysteresis when compounded. In aspects, an aggregate size of the low hysteresis carbon black can be in a range of from about 0.005 to about 1.0 micrometers ($\mu$m), from about 0.01 to about 0.8 $\mu$m, or from about 0.02 to about 0.6 $\mu$m. In one or more aspects, a SMLHCB can have a surface area (e.g., a BET surface area) ranging from about 10 m$^2$/g to about 250 m$^2$/g, alternatively from about 20 m$^2$/g to about 200 m$^2$/g, or alternatively from about 30 to about 150 m$^2$/g.

In aspects, the thiol group(s) present in the surface modification agent may form a chemical bond with unsaturated bonds present in the polymer. The di/polysulfidic linkage in the surface modification agent can fracture during vulcanization and form a chemical bond with unsaturated polymer. In further aspects, the surface modification agent can further react with elemental sulfur to form additional di/poly sulfidic linkages between the filler and polymer.

A SMLHCB or SMLHCB-R, prepared as disclosed herein may be characterized by a surface having an increased number of functionalities present on the surface of the particles when compared to an otherwise similar composition prepared in the absence of thermal-coupling. The increased number of functionalities per particle area may result in an increased number of polymer—filler (e.g., SMLHCB or SMLHCB-R) interactions resulting in a tread compound characterized by (i) an improved rolling resistance, (ii) an improved wet traction (iii) an improved wear resistance, (iv) the combinations of (i), (ii) and (iii) any combination of (i), (ii) or (iii).

Compared to coating and acid-base mix procedures (e.g., see U.S. Patent No. 2022/0243068 A1), the presently disclosed thermochemical coupling procedure provides several advantages including: an increased reaction rate of coupling at high temperatures, avoided reformation of insoluble surface modifying compounds, reduced inhomogeneity of the reaction and coated product, direct exposure of carbon black surface groups to surface modifying compound, rapid water loss in the amide bond formation reaction at high temperatures which speeds up the coupling reaction and reduced drying time of surface treated carbon black.

Polymer Compositions

Also disclosed herein is a rubber composition comprising (i) a SMLHCB and/or SMLHCB-R as defined in Table I, and (ii) a polymer. In one or more aspects, polymer compositions of the type disclosed herein may be useful in the formation of tire tread and are designated T-COMPS. The rubber of the T-COMPS may comprise natural rubber and its various raw, reclaimed, or modified forms; various synthetic rubber polymers; and any combinations thereof, depending upon the desired end use.

Representative synthetic rubber polymers are the homopolymerization products of butadiene and its homologues and derivatives, for example, methyl butadiene, dimethyl butadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SSBR (Solution SBR) or ESBR (Emulsion SBR), as well as vinyl esters and various unsaturated aldehydes, ketones and ethers, e.g., acrolein, methyl isopropenyl-ketone and vinyl-ethyl ether. Specific examples of synthetic rubbers include neoprene (polychloroprene), polybutadiene (including cis-1,4-polyb-utadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile (NBR) and methyl methacry-late, as well as ethylene/propylene terpolymers, also known as ethylene/propylene/diene monomer (EPDM), and ethyl-ene/propylene/dicyclopentadiene terpolymers.

In an aspect, the rubber is chosen from the group con-sisting of styrene butadiene rubber (SBR), polybutadiene rubber, natural rubber, halogenated butyl rubber, butyl rub-ber, polyisoprene rubber, and styrene/isoprene/butadiene terpolymer rubbers.

Examples of a styrene butadiene rubber suitable for use in the present disclosure are those copolymers containing any amount of styrene. When the composition contains a styrene butadiene copolymer, the styrene butadiene rubber may contain 5, 10, 15, 20, 25, 30, 35, 40, 45, 50, 55, 60, 65, 70, 75, 80, 85, 90, and 95% by weight of styrene, including any and all ranges and subranges therein. Examples of polyb-utadiene rubbers suitable for use in the present disclosure include without limitation those having a 1,4 configuration, or 1,2 configuration.

In an aspect, the rubber comprises a styrene butadiene copolymer (SBR) wherein the double bonds of the rubber polymer or copolymer may be at least partially hydroge-nated. The styrene butadiene copolymer may contain double bonds that are more or less than 50% hydrogenated, for example, in the butadiene portion of the copolymer. Alter-natively, the rubber may be 0, 5, 10, 15, 20, 25, 30, 35, 40, 45, 50, 55, 60, 65, 70, 75, 80, 85, 90, 95 and 100% hydrogenated, including any and all ranges and subranges therein. Comparable high levels of hydrogenation are also practiced with hydrogenated nitrile rubbers which are simi-larly within scope of this present disclosure.

SSBR

In another aspect, a rubber compound of this disclosure comprises a solution SBR (SSBR)—polybutadiene (BR) blend. For example, the rubber compound can have a weight ratio of SSBR:BR in a range of from about 100:0, 99.9:0.1; 75:25, 0.1:99.9, or 0:100, or in a range of from about 100:0 to about 0:100, from about 99.9:0.1 to about 0.1:99.9, from about 90:10 to about 10:90, or from about 80:20 to about 20:80, and many instances preferably 75:25 to about 65:35.

Natural Rubber

In one or more aspects, a rubber compound of this disclosure comprises a natural rubber. Natural rubber is a composition of 94% cis-polyisoprene, and 6% other com-pounds, such as carbohydrates, lipids and proteins. Natural rubber represents a truly renewable resource, and is thus of importance pertaining to sustainability and conservation. There are six general grades of technically defined natural rubber and these grades along with their characteristics are presented in Table 1.

TABLE I

| Grades of Technically Specified Natural Rubber (TSR) (ISO 2000 | | | | | | |
|---|---|---|---|---|---|---|
| GRADE | TSR CV | TSR L | TSR S | TSR 10 | TSR 20 | TSR 50 |
| DIRT CONTENT % wt MAX | 0.05 | 0.05 | 0.05 | 0.1 | 0.2 | 0.5 |
| ASH CONTENT % wt MAX | 0.6 | 0.6 | 0.5 | 0.75 | 1 | 1.5 |

TABLE I-continued

| Grades of Technically Specified Natural Rubber (TSR) (ISO 2000 | | | | | | |
|---|---|---|---|---|---|---|
| GRADE | TSR CV | TSR L | TSR S | TSR 10 | TSR 20 | TSR 50 |
| NITROGEN CONTENT % wt MAX | 0.6 | 0.6 | 0.5 | 0.6 | 0.6 | 0.6 |
| VOLATILE MATTER % wt MAX | 0.8 | 0.6 | 0.8 | 0.8 | 0.8 | 0.8 |
| INITIAL WALLACE PLASTICITY Po MIN | | 30 | 30 | 30 | 30 | 30 |
| PLASTICITY RETENTION INDEX (min) | 60 | 60 | 60 | 50 | 40 | 30 |
| COLOR, MAX (LOVIBOND UNITS) | | 6 | | | | |
| MOONEY VISCOSITY | 60 +/− 5 | | | | | |

A nonlimiting example of a natural rubber suitable for use in the present disclosure is 100 PHR natural rubber, the term PHR defining the amount of polymer. In one or more aspects, the TBR tread composition comprises natural rub-ber grade TSR 5, natural rubber grade TSR 10, natural rubber grade TSR 20 or combinations thereof. In an alter-native aspect, the TBR tread composition comprises a natu-ral rubber grade TSR 5 derivative, a natural rubber grade TSR 10 derivative, or a natural rubber grade TSR 20 derivative. Derivatives of these grades of natural rubber may have had their physical properties modified to meet one or more user and/or process goals. In an aspect, the TBR tread comprises natural rubber grade TSR 5 derivative, natural rubber grade TSR 10 derivative, natural rubber grade TSR 20 derivative or combinations thereof where the materials have been derivatized to provide a constant viscosity ver-sion.

A natural rubber suitable for use in the present disclosure may be characterized as having been visually inspected and further defined grades of natural rubber may be produced by smoking and by air drying. Smoked sheet rubbers appropri-ate for use in this disclosure include those described as ribbed smoked sheet (RSS) grades 1 to 5. In an aspect, the natural rubber comprises RSS1, RSS2, RSS3, RSS4 or combinations thereof; alternatively, the natural rubber com-prises RSS2, alternatively the natural rubber comprises RSS3 or alternatively the natural rubber comprises a com-bination of RSS2 and RSS3.

ESBR

In another aspect, application of SMLHCB is not limited to natural rubber and solution SBR, and can be added to emulsion SBR (ESBR) compounded containing 100.0 PHR ESBR or with ESBR also blended with polybutadiene, natural rubber, or specialty elastomers including to not limited to ethylene propylene copolymers or terpolymer dienes (EP and EPDM), nitrile rubbers (NBR), or polychlo-roprene (CR). Such compositions would offer benefits in low rolling resistance and thus energy efficiency and applications will thus include, for example, conveyor belt cover com-pounds. SMLHCB in emulsion SBR compounds used on conveyor belts and conveyor belt systems with multiple flights, and which consume considerable amounts of energy to operate, will thus be more efficient. Other applications would include hose cover compounds, power transmission belts, and dynamic mounts were low compound hysteresis is desired but not currently possible with existing polymers. Other applications also include tire tread compounds, tire sidewall compounds and internal tire components containing emulsion SBR either in compounds containing 100.0 PHR ESBR or in blends with other elastomers.

Other Ingredients

A rubber tire tread formulation suitable for use in the present disclosure may contain vulcanization agents, accelerators, antioxidants, antidegradants, extender oils, peptizers, organo-silane coupling agents, tackifiers and all other additives which may be included in the T-COMPS with rubber singularly or in combination in amounts effective to meet one or more user and/or process needs.

EXAMPLES

The aspects having been generally described, the following examples are given as particular aspects of the disclosure and to demonstrate the practice and advantages thereof. It is understood that the examples are given by way of illustration and are not intended to limit the specification of the claims in any manner.

Example 1

Refined and Unrefined Surface Modified Carbon Black (SMLHCB and SMLHCB-R) Preparation I The thermochemical process described herein uses cystine disodium salt (FIG. 1) as a non-limiting example. Cystine disodium salt (1% to 50% (w/v)) was dissolved in water or cystine (1% to 50% (w/v)) was dissolved in a caustic solution, (e.g., sodium hydroxide) with or without heat aiding, and the solution was added to the pre-weighed carbon black, and the mixture was kept in an oven at 140° C. for 8 hours. Dried surface modified carbon black was then used for the rubber testing. In addition, some surface modified carbon blacks were further refined with water 1-4 times to remove the weakly bound cystine disodium salt. The wet carbon/cystine salt slurry was air dried, followed by oven drying at 140° C. overnight to form SMLHCB—R as defined in Table I.

Surface modified carbon blacks were characterized using X-ray florescence (XRF) per ASTM D1619-16, Method B. Samples N234 and LH11 are the reference control carbon blacks while samples of surface modified carbon blacks, STC #, are SMLHCB of the present disclosure having been treated with differing amounts of surface modifying agents. Specifically, the term, #, being either 2 or 5 or 8 which designates the concentration of coupling agent in weight to volume percent (% w/v) in the treated solution. A sample with the designation W in STC #W indicates the sample was refined subsequent to treatment with the surface modifying agent to form a SMLHCB-R. The coating percentage resulting by reacting with the cystine disodium salt was calculated by difference of sulfur content before and after the surface modification of the carbon black. Results are presented in Table IV. Table V further shows the effect of surface modification on carbon black properties including Iodine Number, Surface area (NSA and STSA), Tint, and structure (OAN and COAN). It is evident that surface modification has reduced the Iodine Number which is desirable for compound hysteresis and lower rolling resistance. The structure of some of surface modified carbon black is not affected which may be desirable for abrasion resistance.

TABLE IV

Elemental Analysis of Surface Treated Carbon Black at Three Treatment Levels identified as 2, 5, 8

| Property | N234 | LH11 | STC2 | STC2W | STC5 | STC5W | STC8 | STC8W |
|---|---|---|---|---|---|---|---|---|
| | | | | Surface Treated Carbon Black | | | | |
| Sulfur Content % | N/A | 0.82 | 1.80 | 1.25 | 2.94 | 1.70 | 3.20 | 1.79 |
| Coating Level % | N/A | N/A | 4.33 | 1.90 | 9.36 | 3.89 | 10.51 | 4.28 |

TABLE V

Carbon Black Properties for Example 1

| Property | | N234 | LH11 | STC2 | STC2W | STC5 | STC5W | STC8 | STC8W |
|---|---|---|---|---|---|---|---|---|---|
| | | | | | Surface Treated Carbon Black | | | | |
| Iodine Number | g/kg | 119.2 | 114.8 | 95.7 | 98.4 | 87.4 | 91.0 | 80.6 | 89.9 |
| Nitrogen Surface Area | m²/g | 116.5 | 116.9 | 98.4 | 111.0 | 83.2 | 107.4 | 73.5 | 102.5 |
| STSA | m²/g | 111.2 | 109.7 | 93.4 | 106.0 | 78.7 | 100.3 | 70.4 | 96.6 |
| Tint | % ITRB | 114.3 | 113.3 | 58.7 | 101.1 | 36.4 | 91.8 | 31.7 | 82.8 |
| OAN | mL/100 g | 127.4 | 135.8 | — | 128.7 | — | 125.6 | — | 124.2 |
| COAN | mL/100 g | 99.5 | 109.2 | 102.3 | 110.4 | 98.4 | 109.7 | 91.6 | 107.4 |

Example 2

Refined and Unrefined Surface Modified Carbon Black (SMLHCB and SMLHCB-R) Preparation II The carbon black was treated with differing surface modifying agents (Table VI) as follows:

The carbon black was weighed and added to a filter (alternatively to a batch pelletizer) before aqueous surface modifying agent solution was poured onto the carbon black. The mix was allowed to soak for 30 seconds undisturbed before a vacuum applied (alternatively spinning the pelletizer) to remove the excess solution. The wet carbon black was transferred into a rotary drier for heat treatment to form SMLHCB. The drier was rotated at relatively low rpm and the temperature of the drier was set to 180 0 C. Then rotary drying was continued to remove excess solution as per the usual industrial process.

In addition, some surface modified carbon blacks were further refined with water 1-4 times to remove the weakly bound surface modifying agent. The wet carbon black slurry was air dried, followed by oven drying at 140 0 C overnight to form SMLHCB-R. Sulfur content of SMLHCBs and SMLHCB-Rs were determined by XRF per ASTM D1619-16, Method B to calculate the coating levels (Table VI). The coating percentages of SMLHCB and SMLHCB-R were calculated by difference of sulfur content before and after the surface modification of the carbon black. The sulfur content of low hysteresis carbon black before the surface modification was 0.82%.

TABLE VI

Coating Levels of Different Surface Modifying Agents

| Aqueous Surface Modifying Agent | Condition | S content, % | Coating Level, % |
|---|---|---|---|
| 2% Cysteine | Unrefined | 1.88 | 4.0 |
| 2% Methionine | Unrefined | 1.31 | 2.3 |
| 4% Cystamine | Unrefined | 2.44 | 3.8 |
| 4% Cystine disodium salt | Unrefined | 1.82 | 4.4 |
| 4% Cystine dimethyl ester | Refined | 1.44 | 2.6 |
| 6% Cysteine sodium Salt | Refined | 1.29 | 2.1 |
| 6% Methionine sodium salt | Refined | 0.98 | 0.90 |

Example 3

Refined and Unrefined Surface Modified Carbon Black (SMLHCB and SMLHCB-R) Preparation III Carbon black was weighed and added to a filter before aqueous 20% cystine disodium salt solution was poured onto the carbon black. The mix was allowed to soak for 30 seconds undisturbed before a vacuum was applied to remove the excess solution. The wet carbon black was kept in an oven at 240 0 C for heat treatment to prepare SMLHCB. SMLHCB was further refined with water to remove the weakly bound cystine disodium salt. The wet carbon/cystine salt slurry was air dried, followed by oven drying at 140° C. overnight to form SMLHCB—R. Table VII further shows the effect of surface modification on carbon black properties including Surface area (NSA and STSA) and structure (COAN). It is evident that surface treatment has reduced the surface area (NSA and STSA) which is desirable for compound hysteresis and lower rolling resistance. Structure (COAN) is not affected significantly which may be desirable for abrasion resistance.

TABLE VII

Carbon Black Properties for Example 3

| Property | | LH11 | SMLHCB | SMLHCB-R |
|---|---|---|---|---|
| Nitrogen Surface Area | m2/g | 118.0 | 77.0 | 101.5 |
| STSA | m2/g | 110.9 | 74.3 | 97.6 |
| COAN | mL/100 g | 102.0 | 91.8 | 108.3 |

NSA Nitrogen Surface Area
STSA Statistical Thickness Surface Area (formerly CTAB)
COAN Crushed Oil Absorption Number (formerly 24M4)

Example 4

Effect of Oxidizing Pretreatment of Carbon Black Before the Surface Modification Low hysteresis carbon black was pretreated using 30% (v/v) aqueous hydrogen peroxide and 10% (v/v) nitric acid solutions to increase the number of acidic groups on carbon black surface. The oxidation was confirmed by pH measurement of pretreated carbon blacks (Table VIII). Dried oxidized and virgin carbon blacks were weighed and added to a filter before aqueous 10% cystamine solution was poured onto the carbon blacks. The mixes were allowed to soak for 30 seconds undisturbed before a vacuum was applied to remove the excess solution. The wet carbon blacks were kept in an oven at 180 0 C for 4 hours to form SMLHCB. The coating percentages of SMLHCBs were calculated by difference of sulfur content before and after the surface modification of the carbon black (Table VIII). Compared with virgin carbon black, oxidized carbon blacks resulted in higher coating levels indicating increases of acidic groups on carbon black surface which can enhance the coating levels of surface modifying agent.

TABLE VIII

The effect of Pre-oxidation on the Surface Treatment

| Carbon Black Type | pH | Coating Level of 10% Cystine Treated Unrefined SMLHCB, % |
|---|---|---|
| LH11 | 6.51 | 11.9 |
| 30% Hydrogen peroxide oxidized LH11 | 3.24 | 13.9 |
| 10% Nitric acid oxidized LH11 | 3.20 | 15.4 |

Example 5

Rubber Compounding I (SSBR Formulation)

As mentioned before, three major properties for passenger tire performance are rolling resistance, wet traction, and wear resistance. In a laboratory test, these properties generally correspond with tan δ values at 60° C. to 70° C., 0° C., and DIN abrasion as measured according to ASTM 5963, respectively. High tan δ at 0° C., low tan δ at 60° C. to 70° C., and low DIN abrasion are desirable.

Two rubber compound formulations were prepared as illustrative examples (Table IX). The silica tread compound formulation may be considered as a standard silica tread compound presented in U.S. Pat. No. 5,227,425 to which further reference is recommended. The carbon black compound developed under this present disclosure will demonstrate improvements over other carbon black types.

TABLE IX

| | SMLHCB Compound Formulation | |
| --- | --- | --- |
| | Compound | |
| Formulation Materials | 1 Silica Compound (PHR) | 2 Carbon Black Compound (PHR) |
| SSBR/BR | 75/25 | 75/25 |
| Carbon Black | 0 | 72 |
| Silica | 80 | 0 |
| X50S (Silane Coupling Agent) | 12.5 | 0 |
| Aromatic Oil | 32.5 | 32.5 |
| Zinc oxide | 2.5 | 2.5 |
| Stearic Acid | 1 | 1 |
| Paraffin Wax | 1.5 | 1.5 |
| Antioxidant (Santoflex 13) | 2 | 2 |
| Sulfur | 1.4 | 2 |
| Santocure NS (TBBS) | 0 | 1.5 |
| Sulfenamide Accelerator (CBS) | 1.7 | 0 |
| Diphenylguanidine Accelerator (DPG) | 2.0 | 0 |

Notes:
1. Santoflex 13: N-(1,3 dimethylbutyl)-N'-Phenyl-1,4-Phenylenediamine [6PPD]
2. Santocure NS: N-tert-Butyl-2-benzothiazolesulfenamide [TBBS]

Example 6

SSBR Formulation: Compounding with Unrefined Surface Modified Low Hysteresis Carbon Black (SMLHCB)

Nine tread compounds were prepared including three SMLHCB and three SMLHCB-R. In this example, compounds with SMLHCB are discussed. Table IX lists the materials used in carbon black and silica tire tread compounds.

Following the formulations in Table IX, a silica compound (Compound 1), a control compound using N234 carbon black (Compound 2), and a control compound using LH11 which is the low hysteresis N234 type of carbon black from Continental Carbon Company in Houston, Texas (Compound 3) was prepared. In addition, three compounds using surface modified carbon blacks described in Example 1 as STC2, STC5 and STC8 were prepared (Compounds 4, 5, 6). Table X summarizes rubber compound data for these compounds.

It is evident that SMLHCB can be used as a tread grade carbon black and in instances where further compound properties require further optimization, this is readily achieved by rubber compound ingredients adjustments such process oil content.

Predictive tire performance data is shown in Table XI. Versus the carbon black reference Compound 2, improvement in DIN index occurred only for Compound 4 (STC2) The improvement in wet traction by STC5 compound was similar to that of silica compound and for the STC8 compound, it was significantly better than silica compound.

In case of rolling resistance, all three compounds with treated carbon black as filler showed improvement compared with N234 compound and improvement by STC5 and STC8 carbon blacks were significantly higher than silica. The results clearly show use of this SMLHCB can permit significant improvement in tire—vehicle fuel economy which is highly desirable.

Figure 6:
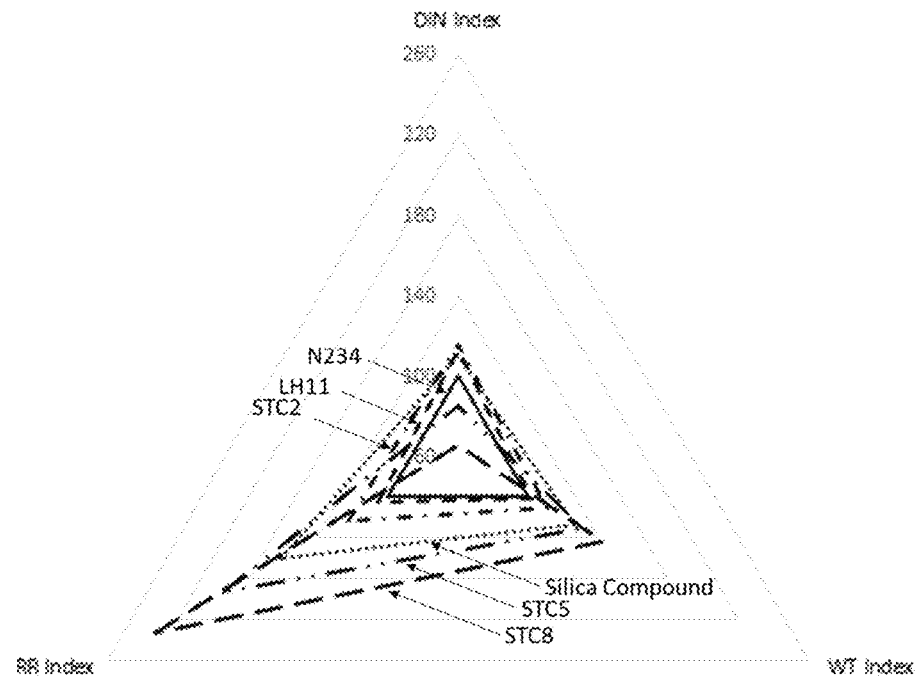
FIG. 6 is the tire performance triangle of unrefined Surface Modified Low Hysteresis Carbon Blacks (SMLHCBs) for Example 6

Referring to FIG. 6, it is evident that in FIG. 6, surface treatment of carbon black may allow a tread compound to display lower rolling resistance with little trade-off in wet traction or tread wear performance.

TABLE X

| | | Compound Data for Example 6 | | | | | |
| --- | --- | --- | --- | --- | --- | --- | --- |
| | | Compound | | | | | |
| | | 1 | 2 | 3 | 4 | 5 | 6 |
| | | Features | | | | | |
| | | Silica | Carbon Black | Carbon Black Grade | Treated | Treated | Treated |
| | Units | HDS | N234 | LH11 | STC2 | STC5 | STC8 |
| DIN Abrasion Cured 35' @ 145° C. | mm³ (volume loss) | 129.7 | 142.2 | 125.4 | 122.1 | 167.3 | 214.2 |
| tan δ | | | | | | | |
| Compression Mode | @ 0° C. | 0.7764 | 0.6133 | 0.6274 | 0.682 | 0.8812 | 0.8744 |
| 10 μm strain, 10 Hz | @ 70° C. | 0.1447 | 0.2332 | 0.2201 | 0.1891 | 0.1201 | 0.1001 |

Notes:

Highly Dispersible Silica (HDS) grade is Zeosil 1165MP obtained from Solvay SA Carbon Black grade N234 and LH11 from the Continental Carbon Company STC2, STC5, and STC8 are experimental treated tread grades of carbon black

TABLE XI

The Effect of SMLHCB on Predicted Tire Performance for Example 6

| | Compound | | | | | |
|---|---|---|---|---|---|---|
| | 1 | 2 | 3 | 4 | 5 | 6 |
| | | | | Property | | |
| | Silica | N234 | LH11 | STC2 | STC5 | STC8 |
| Wear (DIN Abrasion Resistance Indexed) | 110 | 100 | 113 | 116 | 85 | 66 |
| Wet Traction (tan δ @ 0° C.) Indexed | 127 | 100 | 102 | 111 | 131 | 143 |
| Rolling Resistance (tan δ @70° C.) Indexed | 161 | 100 | 106 | 123 | 194 | 233 |

Example 7

The Payne Effect of SMLHCB (SSBR Formulation)

The Payne effect is an important parameter in rubber compounding. The Payne effect is defined as a reduction in the storage modulus (denoted as G') that occurs in a filled rubber compound with an increase in strain on the material. Above a critical strain value, the storage modulus decreases rapidly with increasing strain and starts to level out at large deformations. It is manifested as a dependence of the storage and loss moduli on the amplitude of the applied strain. Above some critical strain amplitude, the storage modulus decreases rapidly with increasing amplitude saturating at rather large deformations, while the loss modulus shows a maximum in the region where the storage modulus decreases. The Payne effect depends on the filler content of the material and vanishes for unfilled elastomers. This nonlinearity effect is strongly dependent on the filler dispersion and aggregation, and consequently on the filler surface treatment which leads to the control the final filler structure at the different scales of observation. In fact, a well-known practice in the rubber industry and compounding with carbon black (or fumed silica) is to obtain the optimal dispersion of fillers without completely suppressing their aggregation into a larger structure. A lower Payne effect is thus desirable being indicative of improved dispersion and polymer filler interaction.

Figure 7:
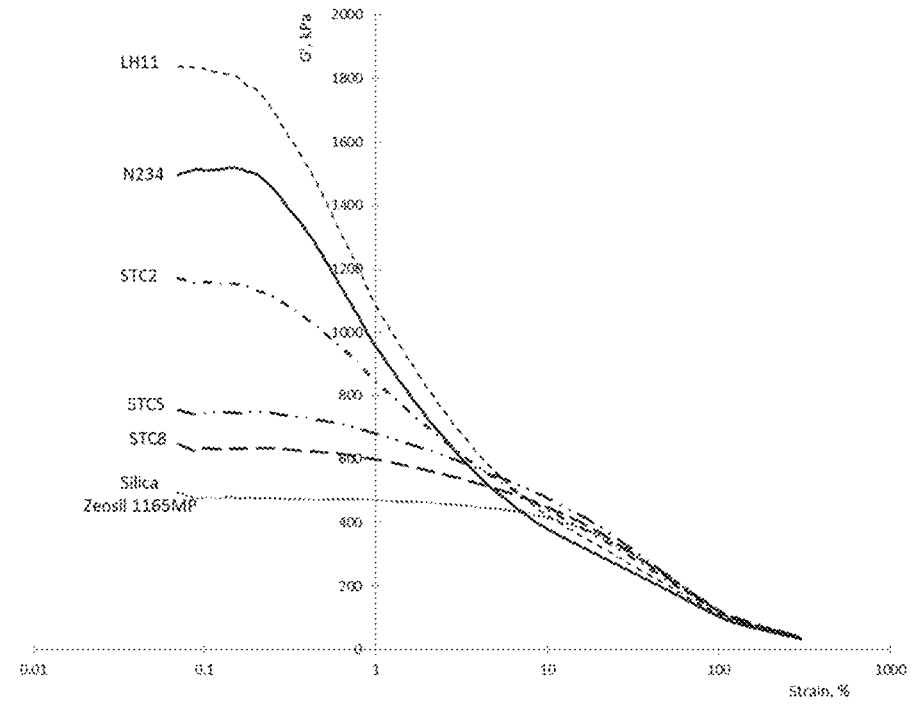
FIG. 7 shows the Payne effect due to compounding with unrefined Surface Modified Low Hysteresis Carbon Blacks (SMLHCBs) for Example 6.

Referring to FIG. 7, this figure shows that through surface modification of carbon black via the SMLHCB process described herein, there is a large reduction in the Payne effect which is not achievable by other means.

Example 8

SSBR Formulation: Compounding with Refined Surface Modified Low Hysteresis Carbon Black (SMLHCB-R) I Compounds prepared for this example were similar to Example 5 compounds, except that the material was further refined with water after treatment and the compounding results are presented in Table XII (The grades STC2W, STC5W and STC8W were refined versions of STC2, STC5 and STC8). In this instance compound data showed that all three performance indices were improved compared with the N234 reference compound. Data showed that DIN index decreased by coating level and eventually for Compound 9 (STC8W) it was similar to the N234 compound.

Although there was an improvement in the wet traction for treated carbon black compounds, they were all less than improvement of the silica compound. Wet traction index for STC2W compound was almost equal to N234 compound, and the largest improvement was for STC5W compound. The improvement in wet traction by STC8W compound was half of the potential for the silica compound.

TABLE XII

Compound Data for Example 8

| | | Compound | | | | | |
|---|---|---|---|---|---|---|---|
| | | 1 | 2 | 3 | 7 | 8 | 9 |
| | | | | | Features | | |
| | | Si-lica | Carbon Black | Carbon Black | Treated STC2W | Treated STCSW | Treated STC8W |
| | | | | | Grade | | |
| | Units | HDS | N234 | LH11 | Refined | Refined | Refined |
| DIN Abrasion Cured 35' @ 145° C. | mm³ (volume loss) | 129.7 | 142.2 | 125.4 | 116.0 | 121.9 | 143.9 |
| tan δ | | | | | | | |
| Compression Mode | @ 0° C. | 0.7764 | 0.6133 | 0.6274 | 0.6229 | 0.7389 | 0.6917 |
| 10 μm strain, 10 Hz | @ 70° C. | 0.1447 | 0.2332 | 0.2201 | 0.2083 | 0.1792 | 0.1736 |

Notes:
Highly Dispersible Silica (HDS) grade is Zeosil 1165MP obtained from Solvay SA Carbon Black grade N234 and LH11 from the Continental Carbon Company STC2W, STC5W, and STC8W, are experimental treated tread grades of carbon black which had undergone subsequent refining to define effect on in-compound properties.

Compound predictive performance results are listed in Table XIII. In the case of rolling resistance index, all three compounds prepared using treated carbon blacks, showed improvement compared with N234 compound, however, these improvements were less than that of the silica compound. The best index was achieved by STC8W compound which was similar to the SCT5W compound index.

For the DIN indices, performance of compounds prepared using refined treated carbon blacks were better compared with compounds prepared using unrefined carbon blacks, however DIN index was decreased by a small amount by increasing treatment level.

TABLE XIII

The Effect of SMLHCB-R on Predicted Tire Performance for Example 8

| | Compound | | | | | |
|---|---|---|---|---|---|---|
| | 1 | 2 | 3 | 7 | 8 | 9 |
| | | | | Property | | |
| | Silica | N234 | LH11 | STC2W | STC5W | STC8W |
| Wear (DIN Abrasion Resistance Indexed) | 110 | 100 | 113 | 123 | 117 | 99 |
| Wet Traction (tan δ @0° C.) Indexed | 127 | 100 | 102 | 102 | 120 | 113 |
| Rolling Resistance (tan δ @70° C.) Indexed | 161 | 100 | 106 | 112 | 130 | 134 |

Figure 8:
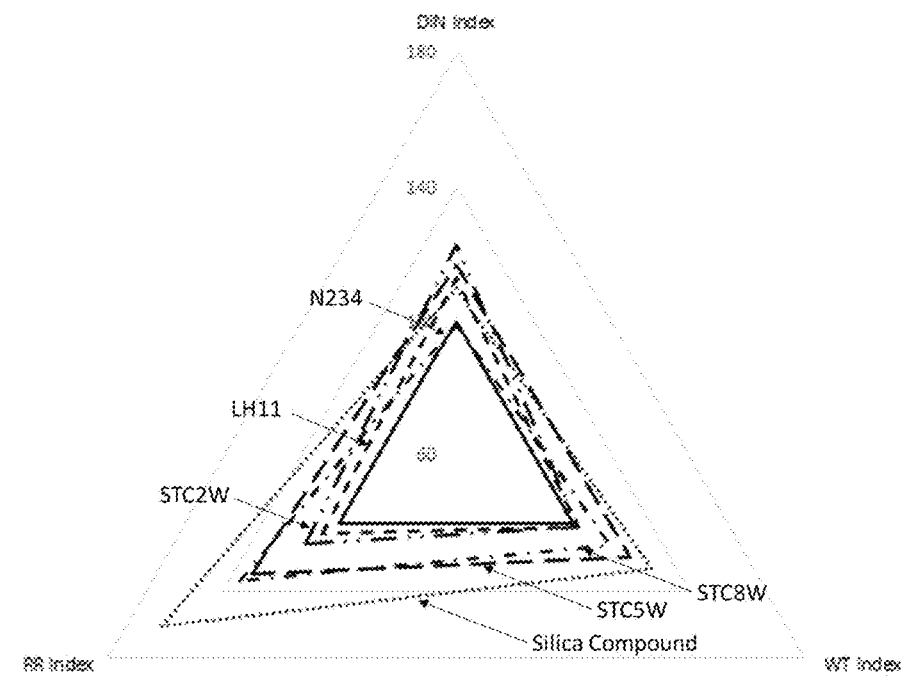
FIG. 8 is the tire performance triangle of refined Surface Modified Low Hysteresis Carbon Blacks (SMLHCB-Rs) for Example 8.

Referring to FIG. 8, for the wet traction and rolling resistance indices, performance of the compounds prepared using refined treated carbon blacks was lower compared with compounds prepared using unrefined carbon blacks but still better than the model tread N234 compound. The general trend for wet traction and rolling resistance indices was that higher the coating level, the better the index; one exception for this trend was in wet traction indices which STC5W compound had better index than STC8W compound as shown in FIG. 8.

Example 9

The Payne Effect of SMLHCB-R (SSBR Formulation)

Figure 9:
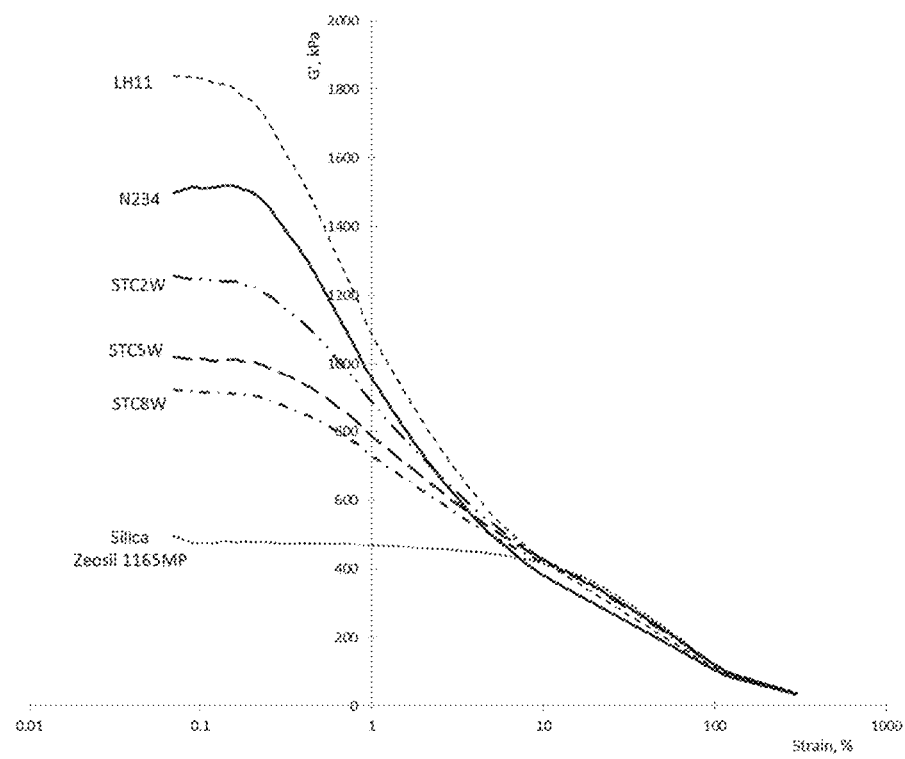
FIG. 9 shows the Payne effect due to compounding with refined Surface Modified Low Hysteresis Carbon Blacks (SMLHCB-Rs) for Example 8.

Referring to FIG. 9, the Payne effect as described in Example 6 is familiar to those skilled in the art of rubber compounding science and technology. Further to the illustration in Example 6, the Payne effect was measured on compounds containing refined SMLHCB whose properties have also been listed in Table XII. It is again shown that there is a large reduction in the Payne effect which would indicate to those knowledgeable in rubber compounding there is wear improvement due to improved dispersion and filler-polymer interaction in place of filler-filler interaction. Furthermore, the improved Payne effect is approaching that of silica compound suggesting better rolling resistance properties as shown in FIG. 9.

Example 10

SSBR Formulation: Compounding with Refined Surface Modified Low Hysteresis Carbon Black (SMLHCB-R) II Four tread compounds were prepared; Table IX lists the materials used in carbon black and silica tire tread compounds. Following the formulations in Table IX, a silica compound (Compound a), a control compound using N234 carbon black (Compound b), and a control compound using LH11 (Compound c) were prepared (full formulations disclosed in Table IX). In addition, one compound using surface modified carbon black described in Example 3 was prepared (Compound d). Table XIV summarizes compound data for these compounds.

TABLE XIV

Compound Data for Example 10

| | | Compound | | | |
|---|---|---|---|---|---|
| | | a | b | c | d |
| | | | Features | | |
| | | Silica | Carbon Black | Carbon Black | Treated |
| | | | | Grade | |
| | Units | HDS | N234 | LH11 | STCW Refined |
| DIN Abrasion | mm³ (volume loss) | 144.6 | 149.1 | 160.2 | 143.6 |
| Cured 35' @ 145° C. tan delta | | | | | |
| Tension Mode 0.4% strain, 10 Hz | @ 0° C. | 0.3906 | 0.3736 | 0.3711 | 0.3950 |
| | @ 70° C. | 0.1471 | 0.1988 | 0.2012 | 0.1389 |

Notes

1. Highly Dispersible Silica (HDS) grade is Zeosil 1165MP obtained from Solvay SA 2. Carbon Black grade N234 and LH11 from the Continental Carbon Company 3. STCW is experimental treated tread grades of carbon black which had undergone subsequent refining to define effect on in-compound properties Compound predictive performance results are listed in Table XV. All the three indices of rolling resistance, wet traction and DIN of SMLHCB-R showed improvement compared with N234 compound. The Improvement of wet traction and DIN index of both SMLHCB-R and silica was the same. Compared to silica compound, SMLHCB-R compound shows 6% improvement on rolling resistance.

TABLE XV

| | | | | |
|---|---|---|---|---|
| Effect of SMLHCB-R on Predicted Tire Performance for example 10 | | | | |
| | | Compound | | |
| Property | a Silica | b N234 | c LH11 | d STCW |
| Wear (DIN Abrasion Resistance Indexed) | 103 | 100 | 93 | 104 |
| Wet Traction (tan δ @ 0° C.) Indexed | 105 | 100 | 99 | 106 |
| Rolling Resistance (tan δ @ 70° C.) Indexed | 135 | 100 | 101 | 143 |

Figure 10:
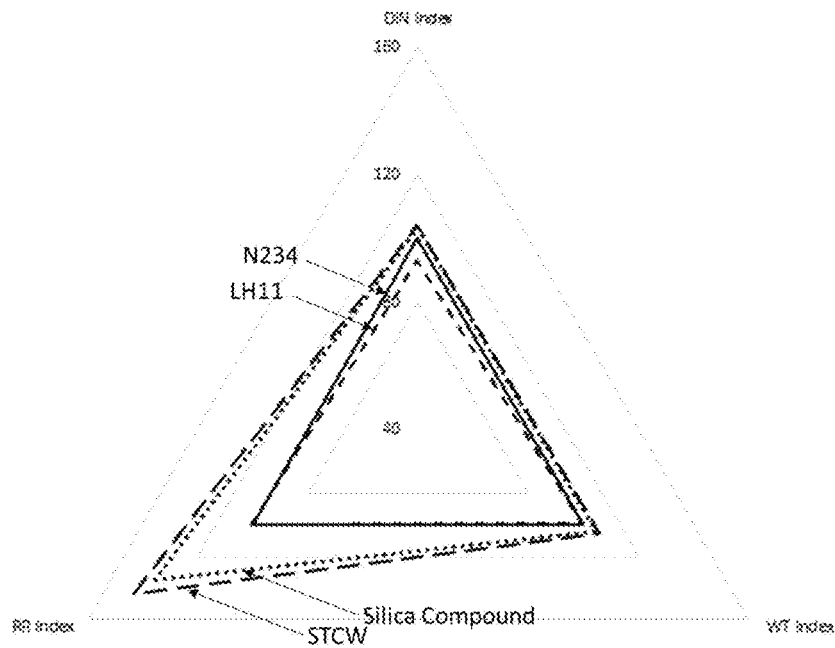
FIG. 10 is the tire performance triangle of refined Surface Modified Low Hysteresis Carbon Black (SMLHCB-R) for Example 10

Referring to FIG. 10, based on examples 6, 8 and 10, the variation of the surface treatment conditions resulted in different coating levels of surface modifying agent on carbon black. Therefore, tire performance properties can be tuned based on coating levels on carbon black. It can be tuned to result in better rolling resistance and wet traction compared to silica compound (shown in FIG. 6), better wear resistance compared to silica compound (shown in FIG. 8), similar wet traction and wear resistance but better rolling resistance compared to silica compound (FIG. 10) or better rolling resistance, wet traction and wear resistance compared to N234 containing compound (shown in FIGS. 8 and 10).

Example 11

Rubber Compounding II (NR Formulation)

A natural rubber tread compound formulation of the type disclosed herein (i.e., TBR tread composition) is shown in Table XVI. This formulation is considered suitable for use as a tread compound for commercial steer axle tires used on line haul trucks, short haul trucks, buses and coaches and pickup and delivery vehicles. The formulation is also suited for new truck tire drive axles and trailer axle positions.

TABLE XVI

| | | |
|---|---|---|
| Compound Data for Example 11 | | |
| Material | Grade | PHR |
| Natural Rubber | TSR10 | 100 |
| Renacit 11- | | 0.15 |
| Carbon Black | N234 | 50 |
| Aromatic Process Oil | TDAE | 3 |
| Paraffin Wax | | 1 |
| Microcrystalline Wax | | 0.5 |
| Antioxidant | TMQ | 1 |
| Antiozonant | 6PPD | 2.5 |
| Zinc Oxide | | 4 |
| Stearic Acid | | 2 |
| TBBS | | 1 |
| Sulfur | | 1 |
| Retarder CTP | | 0.2 |

Notes:
Renacit 11: 2,2'-Dibenzamido-diphenyldisulphide
6PPD: 6 P-phenylenediamine
Retarder CTP: N-(cyclohexylthio)phtalimide Example 12

NR Formulation: Compounding with SMLHCB and SMLHCB-R

Four compounds were prepared using the formulation in Example 11, Table XVI. Compound 1 contained 50 PHR of the ASTM carbon black grade N234 available from Continental Carbon Company, Houston Texas. Compound 2 contained 50 PHR of low hysteresis carbon black grade LH11 also available from Continental Carbon Company, Houston Texas and with properties similar to that of N234. SMLHCB-R and SMLHCB prepared in example 3 were used to prepare Compounds 3 and 4. Compound 3 has 50 PHR of a refined SMLHCB while Compound 4 similarly contained an equal amount of unrefined treated low hysteresis carbon black. Table XVII provides the rheological and mechanical properties of the indicated compounds.

TABLE XVII

| | | | | | |
|---|---|---|---|---|---|
| Compound Data for Example 12 | | | | | |
| | | Compound | | | |
| | | 1 | 2 | 3 | 4 |
| | | Features | | | |
| | | Carbon Black | Carbon Black | Carbon Black | Treated |
| | | | Grade | | |
| | | | | SMLHCB-R | SMLHCB |
| | Units | N234 | LH11 | Refined | Unrefined |
| Mooney Viscosity RPA Cure @ 160° C. | | | | | |
| ML 1 + 4 @ 100° C. MDR Rheometer | MU | 43.56 | 49.36 | 56.62 | 50.31 |
| MH, in-lb | Min | 11.451 | 11.646 | 12.880 | 12.492 |
| ML, in-ib | Min | 1.355 | 1.710 | 2.047 | 1.169 |
| MH − ML, in-lb | Min | 10.096 | 9.936 | 10.832 | 11.323 |
| $T_s2$, min | Min | 3.36 | 3.65 | 2.43 | 2.44 |
| $T_c50$, min | Min | 4.30 | 4.57 | 3.36 | 3.28 |
| $T_c90$, min | Min | 6.62 | 6.90 | 5.63 | 5.26 |
| Core Rate Index | s° | 30.67 | 30.77 | 31.25 | 35.46 |

TABLE XVII-continued

| Compound Data for Example 12 | | | | | |
|---|---|---|---|---|---|
| | | Compound | | | |
| | | 1 | 2 | 3 | 4 |
| | | Features | | | |
| | | Carbon Black | Carbon Black | Carbon Black | Treated |
| | | | Grade | | |
| | Units | N234 | LH11 | SMLHCB-R Refined | SMLHCB Unrefined |
| Tensile Strength | | | | | |
| Tensile, psi | Mpa | 28.28 | 27.24 | 28.11 | 20.03 |
| Elongation | % | 625 | 590 | 627 | 508 |
| M 50% | MPa | 1.71 | 1.70 | 1.84 | 1.77 |
| M 100% | Mpa | 2.38 | 2.37 | 2.61 | 2.60 |
| M 200% | Mpa | 5.59 | 5.58 | 5.65 | 4.97 |
| M 300% | | 10.58 | 10.70 | 10.13 | 8.47 |
| Hardness | Shore "A" | 63 | 62 | 62 | 61 |
| Tear Strength | ×Nm | 146.4 | 153.1 | 158.9 | 100.7 |

Figure 11:
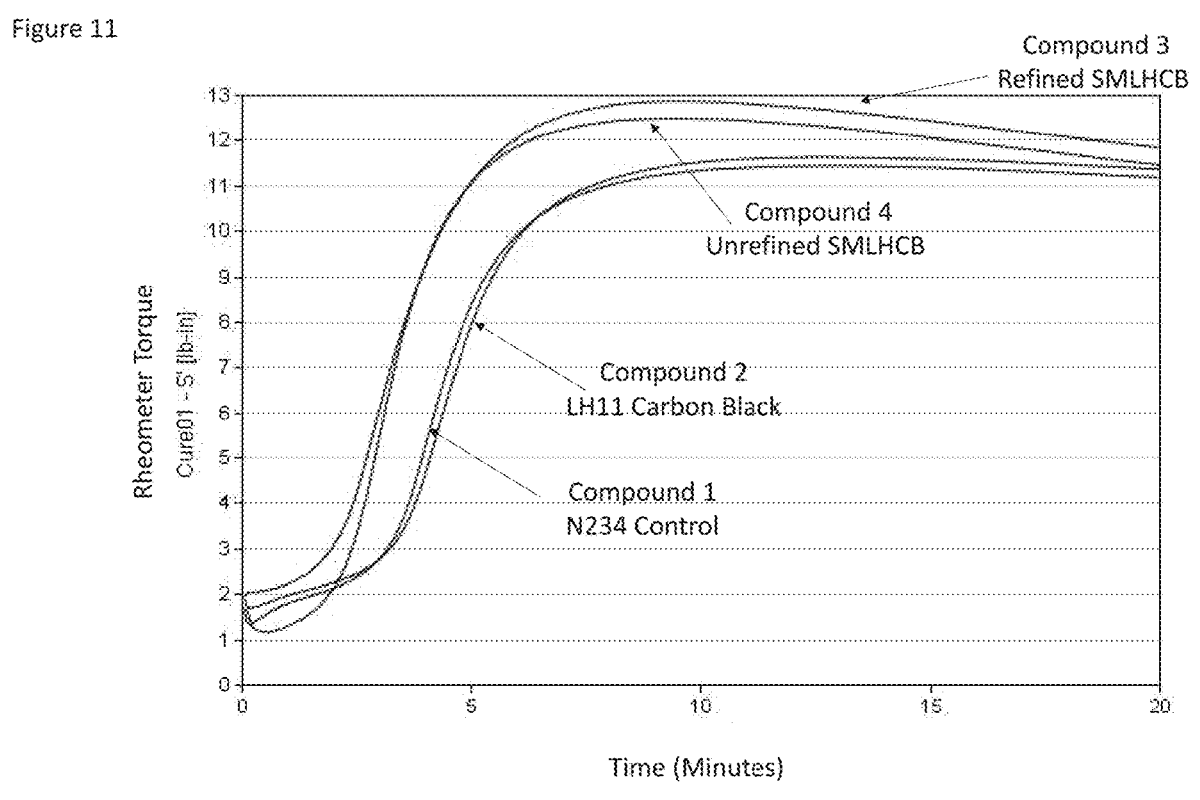

Referring to FIG. 11, treating the carbon black with cystine disodium salt was observed to shift the vulcanization kinetics but this would be adjustable by changing the accelerator and sulfur content in the formulation. Tensile strength and modulus were not affected by treating and refining the carbon black (Compound 3). Similarly, compound hardness and tear strength were not affected. It is thus evident that replacement of N234 carbon black with SMLHCB (refined) at equal PHR did not require re-compounding, i.e., it is a drop in. The rheometer vulcanization profiles for the four compounds are shown in FIG. 11.

Example 13

Payne Effect of SMLHCB and SMLHCB-R (NR Formulation)

Figure 12:
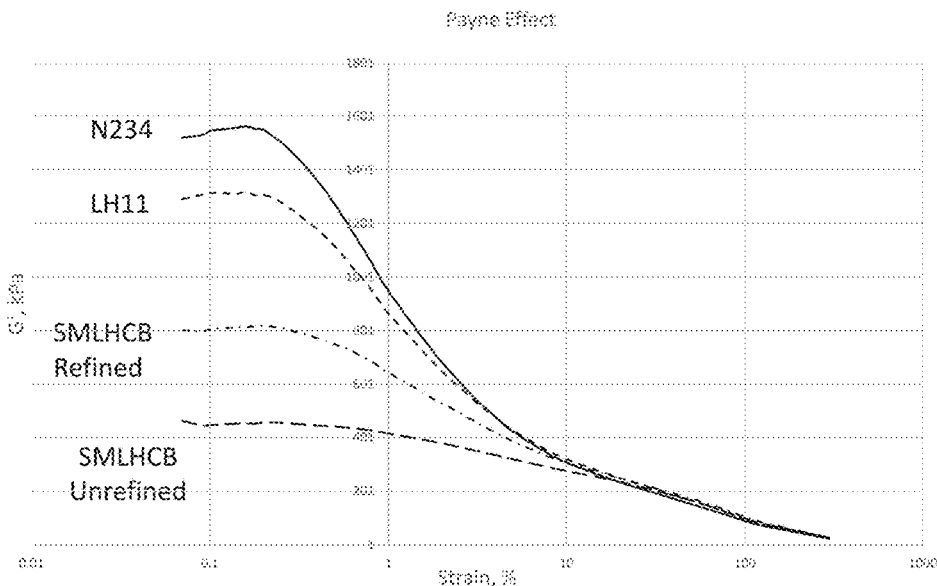
FIG. 12 shows the Payne effect due to compounding with unrefined and refined Surface Modified Low Hysteresis Carbon Black (CMLHCB and SMLHCB-R) for Example 12.

Referring to FIG. 12, stress-softening of filled rubber samples is known as the Payne effect which is defined as the difference of modulus measured at low and high strains, $\Delta G^*$. Reduction in stress softening is due to lower filler-filler interaction and improved filler—polymer interaction which in turn infers improved abrasion resistance and tread wear performance. FIG. 12 shows a strain sweep for each of the four compounds from Example 12. Progressing from Compound 1 containing 50 PHR N234 carbon black to Compound 2 with 50 PHR of LH11 carbon black there is a large drop in the Payne effect (about 20%) which is desirable. Progressing further to SMLHCB refined there is another larger drop (about 60%), thus inferring improved compound dispersion and improved compound abrasion resistance. Yet again the Payne effect undergoes a further drop (about 85%) using unrefined SMLHCB (compound 4).

Example 14

Compound Dynamic Properties of SMLHCB and SMLHCB-R (NR Formulation)

For the samples from Example 12, dynamic mechanical test analysis (DMTA) was conducted and the results are presented in Table XVIII. Two sets of data are provided, compound rebound and dynamic testing conducted in a compression mode. Rebound was measured at 0° C., 21° C., 60° C., and 70° C. Because the rebound sample bulk, it offers a more representative view of the test compound resilience. It is known to those knowledgeable in the art of rubber compounding that hot rebound, i.e., at 60° C. and above, is representative of tire rolling resistance, the higher the rebound and the lower the rolling resistance being preferred. Conversely, as a predictive tool, rebound at low temperatures is indictive of traction characteristics, the lower the rebound at 0° C., the better the traction.

Regarding DMTA and testing methods, compression mode was investigated. It is proposed that truck tires have rib tread patterns rather than individual tread elements such as blocks seen in the case of automobile tires. Automobile tread blocks will undergo lateral and forward shear and distortion as the tire tread enters its footprint. For large commercial truck tires with rib tread patterns there is much less lateral or radial shear but more vertical load (pressure) on the rib. This hysteresis generated in compression mode may be more indicative of deformations occurring to the liner circumferential tread ribs as the truck tire enters and leaves its footprint while in rotation.

Viewing Table XVIII, treating carbon black with cystine salt (e.g., a SMLHCB) leads to a significant increase in rebound at 60° C. and 70° C. This shift in rebound is sufficient to represent significant improvements in whole tire rolling resistance. At 0° C. the shift is too small to have a significant effect on traction.

Similarly, for DMTA data at 30° C. and 60° C., treatment of the carbon black leads to a drop in tangent delta inferring improved rolling resistance. It is noted that as tire rolling resistance over the previous 30 years has continued to drop, tire operating temperatures have similarly dropped. Therefore, measurement of compound hysteresis at lower temperatures such as at 30° C. in addition to measurement at 60° C. is appropriate. As is the case at the higher temperature, tangent delta at 30° C. showed a significant drop inferring lower tread compound rolling resistance contribution which is highly desirable. Tangent delta is a function of both the storage modulus G' and loss modulus G". Though both parameters change with treatment of carbon black, the magnitude of the shift in tangent delta was due more to the loss modulus suggesting lower hysteresis and energy loss, rather than stiffness loss which would be detrimental to abrasion resistance.

TABLE XVIII

| | | Compound | | | |
|---|---|---|---|---|---|
| | | 1 | 2 | 3 | 4 |
| | | | Features | | |
| | | Carbon Black | Carbon Black | Carbon Black | Treated |
| | | | Grade | | |
| Property | Units | N234 | LH11 | SMLHC8-8 Refined | SMLHCB Unrefined |
| Zwick Rebound | 0° C. | 35.6 | 35.4 | 39.0 | 49.0 |
| Cured 35' @ 145° C. | 21° C. | 46.4 | 48.0 | 52.8 | 62.4 |
| | 60° C. | 55.2 | 56.8 | 63.2 | 73.2 |
| | 70° C. | 58.6 | 59.2 | 66.0 | 74.8 |
| Compound | Compression | 1 | 2 | 3 | 4 |
| DMTA in Mpa | Mode | | | | |
| G' | −21° C. | 141.37 | 136.79 | 121.38 | 76.66 |
| G" | | 51.25 | 50.36 | 44.45 | 28.22 |
| tan δ | | 0.3625 | 0.3682 | 0.3662 | 0.3681 |
| G' | 0° C. | 105.06 | 104.14 | 91.20 | 59.47 |
| G" | | 30.94 | 31.88 | 26.95 | 15.74 |
| tan δ | | 0.2945 | 0.3061 | 0.2956 | 0.2647 |
| G' | 30° C. | 64.00 | 62.75 | 57.61 | 40.00 |
| G" | | 15.36 | 14.60 | 12.01 | 6.47 |
| tan δ | | 0.2399 | 0.2377 | 0.2085 | 0.162 |
| G' | 60° C. | 44.12 | 43.52 | 42.08 | 30.63 |
| G" | | 9.78 | 9.12 | 7.26 | 3.86 |
| tan δ | | 0.222 | 0.210 | 0.172 | 0.126 |

Example 15

Abrasion Resistance of SMLHCB and SMLHCB-R (NR Formulation)

Truck tire tread abrasion is a complex phenomenon with tensile rupture and tearing, and thermo-oxidative mechanism occurring. Furthermore, it is typical that as truck tire tread compound hysteresis or heat build-up decreases with the decrease in rolling resistance the trade-off is loss in abrasion resistance. Previously, in carbon black tread compounds this challenge remained unsolved.

As an indicator of abrasion resistance, the DIN abrasion test was conducted on the four compounds (Table XVII). The reference compound as described in DIN 53516, ISO 4649, and ASTM D5963 may show abraded volume loss range of +/−5% with the results in the range considered equivalent. In this example, test results for surface treated low hysteresis carbon blacks in Compounds 3 and 4 show equivalencies to the reference Compound 1 containing the carbon black, N234. It is thus evident that replacement of the carbon black N234 with a SMLHCB allows significant improvement in compound hysteresis and tire rolling resistance with no loss in tread compound abrasion resistance, tensile strength, or tear strength.

TABLE XIX

| | | Compound | | | |
|---|---|---|---|---|---|
| | | 1 | 2 | 3 | 4 |
| | | | Features | | |
| | | Carbon Black | Carbon Black | Carbon Black | Treated |
| | | | | Grade | |
| Property | Units | N234 | LH11 | SMLHCB-R Refined | SMLHCB Unrefined |
| DIN Abrasion Volume Loss | mm³ | 180.6 | 166.8 | 176.9 | 190.1 |

Discussion of Examples

While various aspects have been shown and described, modifications thereof can be made by one skilled in the art without departing from the spirit and teachings of the disclosure and has been noted earlier. The aspects described herein are exemplary only and are not intended to be limiting. Many variations and modifications of the aspects disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, for illustration). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of and comprised substantially of.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects disclosed herein. The discussion of a reference herein is not an admission that it is prior art to the present disclosure, especially any reference that may have a publication date after the priority date of this present disclosure.

Additional Disclosure

The following are non-limiting, specific aspects accordance with the present disclosure:

A first aspect which is an unrefined surface modified low hysteresis carbon black (SMLHCB) or a refined surface modified low hysteresis carbon black (SMLHCB-R) product, comprising:

a low hysteresis carbon black having a surface that has been modified to have a surface modifier or fragment of surface modifier attached thereto, wherein the surface modifier comprises at least one amine group and at least one thiol group and/or di- and/or polysulfidic linkage thereof, wherein the surface modifier attached on a fraction of surfaces of low hysteresis carbon black, and the surface modifier exists at discrete, spaced apart regions at the surface of the low hysteresis carbon black.

A second aspect which is the SMLHCB or SMLHCB-R of the first aspect, wherein the surface modifier comprises an amino acidic compound or its' derivative.

A third aspect which is the SMLHCB or SMLHCB-R of the second aspect, wherein the amino acidic compound comprises a naturally occurring amino acid; a modified natural amino acid; a synthetic amino acid; a dimer thereof; a polymer thereof; a salt thereof; a derivative thereof, or a combination thereof.

A fourth aspect which is the SMLHCB or SMLHCB-R of the second and third aspects, wherein the amino acidic compound or its' derivative comprises cysteine, cystine, homocysteine, homocystine, methionine, cysteamine, cystamine, cystine dimethyl ester, and a combination thereof.

A fifth aspect which is the SMLHCB or SMLHCB-R of the first to fourth aspects, wherein the surface modifier comprises an amino acidic compound or its' derivative having at least one amine group and at least one thiol group and/or di- and/or polysulfidic linkage, and/or an organic or inorganic compound containing at least one amine group, and at least one thiol group and/or di- and/or polysulfidic linkage.

A sixth aspect which is the SMLHCB or SMLHCB-R product of any of prior aspects, wherein the amine group contained in the surface modifier is any type of amine suitable for linking to the carbon black surface.

A seventh aspect which is the SMLHCB or SMLHCB-R product of any of prior aspects, wherein the amine group contained in the surface modifier is a primary amine, secondary amine or a tertiary amine with suitable catalyst for linking to the carbon black surface.

An eighth aspect which is the SMLHCB or SMLHCB-R product of any of prior aspects, wherein surface modifier is linked to the surface via single or multiple bonds.

A ninth aspect which is the SMLHCB or SMLHCB-R product of any of prior aspects, wherein the surface modifier is linked to the carbon black surface by an amide or other bond formation, chemisorption, and/or physisorption.

A tenth aspect which is the SMLHCB or SMLHCB-R product of any of prior aspects, wherein the surface modifier is linked to the carbon black surface by at least one of, van der Waals interactions, ionic and/or covalent or other non-covalent interactions with active surface moieties of the surface.

An eleventh aspect which is the SMLHCB or SMLHCB-R product of any of prior aspects, wherein said active surface moieties comprise oxygen, nitrogen, and/or sulfur on the surface.

A twelfth aspect which is the SMLHCB or SMLHCB-R product of any of prior aspects, wherein the surface modifier comprises from about 0.1 wt. % to about 50 wt. %, from about 0.1 wt. % to about 30 wt. %, from about 1 wt. % to about 16 wt. %, or from about 3 wt. % to about 20 wt. % of the surface modified carbon black (e.g., of the SMLHCB).

A thirteenth aspect which is the SMLHCB or SMLHCB-R product of any of prior aspects, wherein said SMLHCB or SMLHCB-R product has a widened aggregate size distribution with a higher percentage of larger aggregates than a standard ASTM grade carbon black that does not demonstrate low hysteresis when compounded.

A fourteenth aspect which is the SMLHCB or SMLHCB-R product of any of prior aspects, wherein the aggregate size of the low hysteresis carbon black can be in a range of from about 0.005 to about 1.0 micrometers (μm), from about 0.01 to about 0.8 μm, or from about 0.02 to about 0.6 μm.

A fifteenth aspect which is the SMLHCB or SMLHCB-R product of any of prior aspects, wherein SMLHCB or SMLHCB-R has a surface area ranging from about 10 m²/g to about 250 m²/g, alternatively from about 20 m²/g to about 200 m²/g, or alternatively from about 30 to about 150 m²/g.

A sixteenth aspect which is the SMLHCB or SMLHCB-R product of any of prior aspects, wherein the said surface was oxidized prior to the surface modification of the low hysteresis carbon black filler to produce the SMLHCB or SMLHCB-R.

A seventeenth aspect which is the SMLHCB or SMLHCB-R product of any of prior aspects, wherein the surface was oxidized by ozone treatment, heat treatment, plasma treatment, nitrogen oxides treatment, gaseous or aqueous hydrogen peroxide treatment, liquid nitric acid treatment, or a combination thereof.

An eighteenth aspect, a method of producing a SMLHCB comprises: treating a surface of a low hysteresis carbon black with about 0.1% (w/v) to about 50% (w/v), with about 0.1% (w/v) to 30% (w/v), preferably with about 1')/0 (w/v) to about 20% (w/v) of surface modifying agent in a suitable solvent (e. g., water) followed by a heat treatment wherein the surface modifier comprises at least one amine group and at least one thiol group and/or di- and/or polysulfidic linkage.

A nineteenth aspect which is the method of eighteenth aspect, wherein the surface modifying agent is linked to the carbon black surface via thermochemical coupling.

A twentieth aspect which is the method of eighteenth and nineteenth aspect, wherein thermochemical coupling comprises heat treatment.

A twenty first aspect which is the method of eighteenth to twentieth aspects, wherein heat treatment is applied by any suitable heating source.

A twenty second aspect which is the method of eighteenth to twenty first aspects, wherein treating a carbon black with a surface modifying agent at a temperature ranging from about 600° C., to about 450° C., from about 90° C. to about 350° C. or preferably from about 120° C. to about 300° C. for a time period of from about 0 to about 72 Hours, from about 0 to about 24 Hours, from about 0 to about 8 Hours, or preferably from about 0 to about 0.5 Hours.

A twenty third aspect which is the method of eighteenth to twenty second aspects, wherein SMLHCB is further refined at least one time by contacting the SMLHCB with a fluid (e.g., water) to form refined surface modified low hysteresis carbon black (SMLHCB-R).

A twenty fourth aspect which is the method of eighteenth to twenty third aspects, wherein an aggregate size of the low hysteresis carbon black can be in a range of from about 0.005 to about 1.0 micrometers (μm), from about 0.01 to about 0.8 μm, or from about 0.02 to about 0.6 μm.

A twenty fifth aspect which is the method of eighteenth to twenty third aspects, wherein the SMLHCB or SMLHSB-R has a surface area ranging from about 10 m²/g to about 250 m²/g, alternatively from about 20 m²/g to about 200 m²/g, or alternatively from about 30 to about 150 m²/g.

A twenty sixth aspect which is a rubber compound comprising a SMLHCB or SMLHCB-R product wherein a SMLHCB or SMLHCB-R having a surface that has been modified to have a surface modifier or fragment of surface modifier attached thereto, wherein the surface modifier comprises at least one amine group and at least one thiol group and/or di- and/or polysulfidic linkage thereof, wherein the surface modifier in SMLHCB or SMLHCB-R attached on a fraction of surfaces of low hysteresis carbon black, and the surface modifier exists at discrete, spaced apart regions at the surface of the low hysteresis carbon black.

A twenty seventh aspect which is rubber compound of twenty sixth aspect, wherein polymer contained in the rubber compound is a natural or synthetic or polymer blend.

A twenty eightieth aspect which is the rubber compound of twenty seventh aspect, wherein the polymer contained in the rubber compound comprises natural rubber, solution SBR, emulsion SBR, functional solution SBR, polyisoprene, polybutadiene, EPDM, nitrile, butyl, halogenated butyl, silicone rubber and any combination thereof.

A twenty ninth aspect which is the rubber compound of twenty seventh and twenty eighth aspects, wherein the polymer contained in the rubber compound comprises a solution styrene butadiene rubber (SBR) (SSBR)-polybutadiene rubber (BR) blend.

A thirtieth aspect which is the rubber compound of twenty eightieth aspects, wherein the polymer contained in the rubber compound comprises a weight ratio of SSBR: BR of about 100.0, or in a range of 100:0 to about 0:100.

A thirty first aspect which is the rubber compound of twenty seventh and twenty eighth aspects, wherein the polymer contained in the rubber compound comprises 100 PHR natural rubber, natural rubber grade TSR 5, natural rubber grade TSR 10, natural rubber grade TSR 20, RSS1, RSS2, RSS3, RSS4, RSS5, derivatives thereof or combinations thereof.

A thirty second aspect which is the rubber compound of twenty sixth to thirty first aspects, wherein the rubber compound comprises a reduced filler-filler networking, an increased polymer-filler interaction, or both reduced filler-filler networking and increased polymer-filler interactions, relative to an otherwise same rubber compound produced with a standard ASTM grade carbon black that is not low hysteresis.

A thirty third aspect which is the rubber compound of twenty sixth to thirtieth aspects, wherein the rubber compound containing SMLHCB-R comprises improved rolling resistance and hence better tire—vehicle fuel economy compared with Industry standard ASTM grades of carbon blacks.

A thirty fourth aspect which is the rubber compound of twenty sixth to thirtieth aspects, wherein the rubber compound containing SMLHCB-R comprises improved tire traction performance compared with industry standard ASTM grades of carbon blacks.

A thirty fifth aspect which is the rubber compound of twenty sixth to thirtieth aspects, wherein the rubber compound containing SMLHCB-R comprises improved tire tread wear performance compared with industry standard ASTM grades of carbon blacks.

A thirty sixth aspect which is the rubber compound of twenty sixth to thirtieth aspects, wherein the rubber compound containing SMLHCB-R comprises simultaneous improved rolling resistance performance, tire traction performance, tire wear performance compared with industry standard ASTM grades of carbon blacks.

A thirty seventh aspect which is the rubber compound of twenty sixth to thirtieth aspects, wherein the rubber compound containing SMLHCB-R comprises improved rolling resistance and hence better tire—vehicle fuel economy compared with industry standard silica tread-based compound.

A thirty eighth aspect which is the rubber compound of twenty sixth to thirtieth aspects, wherein the rubber compound containing SMLHCB-R) comprises improved tire tread wear performance compared with industry standard silica tread-based compound.

A thirty ninth aspect which is the rubber compound of twenty sixth to thirtieth aspects, wherein the rubber compound containing SMLHCB-R comprises simultaneous improved rolling resistance, tire traction performance, tire wear performance comparable with industry standard silica tread-based compound.

A fortieth aspect which is the rubber compound of twenty sixth to thirtieth aspects, wherein the rubber compound containing SMLHCB comprises improved rolling resistance performance and hence better tire—vehicle fuel economy compared with industry standard silica tread-based compound.

A forty first aspect which is the rubber compound of twenty sixth to thirtieth aspects, wherein the rubber compound containing SMLHCB comprises improved tire traction performance compared with industry standard silica tread-based compound.

A forty second aspect which is the rubber compound of twenty sixth to thirtieth aspects, wherein the rubber compound containing SMLHCB or SMLHCB-R reduces the compound Payne effect compared with an industry standard ASTM grades of carbon blacks.

A forty third aspect which is the rubber compound of twenty sixth to thirtieth aspects, wherein the rubber compound containing SMLHCB or SMLHCB-R is suited for passenger tire tread compound formulations.

A forty fourth aspect which is the rubber compound of twenty sixth to twenty eighth and thirty first aspects, wherein the rubber compound containing SMLHCB or SMLHCB-R can replace N234 carbon black at equal levels or part for part with no trade-off in laboratory measured compound properties.

A forty fifth aspect which is the rubber compound of twenty sixth to twenty eighth and thirty first aspects, wherein the rubber compound containing SMLHCB or SMLHCB-R reduces the compound Payne effect, which is desirable, with no change on other fundamental properties.

A forty sixth aspect which is the rubber compound of twenty sixth to twenty eighth and thirty first aspects, wherein the rubber compound containing SMLHCB or SMLHCB-R leads to a significant increase in rebound at 60° C. and 70° C. This infers significant improvement in tire—vehicle fuel economy.

A forty seventh aspect which is the rubber compound of twenty sixth to twenty eighth and thirty first aspect, wherein the rubber compound containing SMLHCB or SMLHCB-R lowers compound tangent delta at 30° C. and 60° C. indicating improved rolling resistance.

A forty eighth aspect which is the rubber compound of twenty sixth to twenty eighth and thirty first aspects, wherein the rubber compound containing SMLHCB or SMLHCB-R shift in tangent delta is primarily due to a decrease in loss modulus G".

A forty ninth aspect which is the rubber compound of twenty sixth to twenty eighth and thirty first aspects, wherein the rubber compound containing SMLHCB-R maintains abrasion resistance and tear strength while achieving an improvement in hysteresis and in consequence, lower tire rolling resistance, and in consequence improved tire-vehicle fuel economy.

A fiftieth aspect which is the rubber compound of twenty sixth to twenty eighth and thirty first aspects, wherein the rubber compound containing SMLHCB or SMLHCB-R is suited for use on commercial truck tires for all wheel positions.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: $R=RI+k^*(Ru-RI)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of producing a surface modified low hysteresis carbon black (SMLHCB) or a refined surface modified low hysteresis carbon black (SMLHCB-R) compound, the method consisting essentially of the steps of:

treating a surface of a non-oxidized low hysteresis carbon black with about 0.1% weight by volume (w/v) to about 50% (w/v) of surface modifying agent in a solvent, wherein the non-oxidized low hysteresis carbon black having wide aggregate size distribution with higher percentage of larger aggregates than a standard ASTM grade carbon black and aggregates size of the low hysteresis carbon black is a range from 0.005 micrometers to about 1.0 micrometers, and heat treating the surface of the non-oxidized low hysteresis carbon black following the treatment of the surface with the surface modifying agent to form a SMLHCB compound, wherein the surface modifier comprises at least one amine group and at least one thiol group and/or di- and/or polysulfidic linkage, wherein the surface modifier comprises an amino acidic compound or a derivative of the amino acidic compound.

2. The method of claim 1, wherein the surface modifying agent is linked to the carbon black surface via thermochemical coupling.

3. The method of claim 2, wherein the thermochemical coupling comprises heat treatment.

4. The method of claim 1, wherein the heat treatment is applied by any suitable heating source.

5. The method of claim 1, wherein the non-oxidized low hysteresis carbon black is treated with the surface modifying agent at a temperature ranging from about 90 degrees Celsius (° C.), to about 450° C. for a time period of at least 10 seconds.

6. The method of claim 1, further comprising:

refining the SMLHCB compound by contacting the SMLHCB compound with a fluid at least one time to form a SMLHCB-R compound.

7. The method of claim 1, wherein the SMLHCB compound has a surface area ranging from about 10 meters squared per gram ($m^2/g$) to about 250 $m^2/g$.

8. The refining process of claim 6, wherein the contacting fluid of the SMLHCB compound is water.

9. The refining process of claim 6, wherein the SMLHCB compound is contacted with a fluid to remove weakly bound surface modifying agent.

10. The refining process of claim 6, wherein the SMLHCB compound is contacted with a fluid by any suitable contacting method.

11. The refining process of claim 6, wherein the SMLHCB compound is contacted with a fluid for at least about 1 second.

12. The refining process of claim 6, wherein the contacted fluid of the SMLHCB compound is separated after the contact to isolate the SMLHCB-R compound by any suitable separation method.

13. The refining process step of claim 12, wherein the isolated SMLHCB-R compound is heated at least about 60 degrees Celsius (° C.) to about 200° C. to remove excess fluid.

14. The refining process of claim 10, wherein the suitable contacting method is agitation or spraying.

15. The refining process of claim 12, wherein the separation method is decantation or vacuum filtration.

16. A method of producing a surface modified low hysteresis carbon black (SMLHCB) or a refined surface modified low hysteresis carbon black (SMLHCB-R) compound, the method consisting essentially of the steps of:

treating a surface of a non-oxidized low hysteresis carbon black with about 0.1% weight by volume (w/v) to about 50% (w/v) of surface modifying agent in a solvent, wherein non-oxidized low hysteresis carbon black having wide aggregate size distribution with higher percentage of larger aggregates than a standard ASTM grade carbon black and aggregates size of the low hysteresis carbon black is a range from 0.005 micrometers to about 1.0 micrometers, and heat treating the surface of the non-oxidized low hysteresis carbon black following the treatment of the surface with the surface modifying agent to form a SMLHCB compound, wherein the surface modifier comprises at least one amine group and at least one thiol group and/or di- and/or polysulfidic linkage, wherein the surface modifier comprises an amino acidic compound or a derivative of the amino acidic compound, wherein the surface modifier is linked to the surface of the non-oxidized low hysteresis carbon black via acidic groups present on the carbon black surface to form amide bonds.

* * * * *